US006988127B2

(12) United States Patent
Matsuda et al.

(10) Patent No.: US 6,988,127 B2
(45) Date of Patent: Jan. 17, 2006

(54) ADVERTISING AND MANAGING COMMUNITIES WITHIN A VIRTUAL SPACE

(75) Inventors: Satoru Matsuda, Kanagawa (JP); Mioko Sakuragi, Tokyo (JP)

(73) Assignee: Sony Corporation, Tokyo (JP)

(*) Notice: Subject to any disclaimer, the term of this patent is extended or adjusted under 35 U.S.C. 154(b) by 736 days.

(21) Appl. No.: 10/001,356

(22) Filed: Oct. 31, 2001

(65) Prior Publication Data

US 2002/0087636 A1  Jul. 4, 2002

(30) Foreign Application Priority Data

Oct. 31, 2000  (JP) .......................... P2000-332923

(51) Int. Cl.
*G06F 15/16* (2006.01)
(52) U.S. Cl. ...................... 709/204; 709/223
(58) Field of Classification Search ........ 709/203–207, 709/223–226
See application file for complete search history.

(56) References Cited

U.S. PATENT DOCUMENTS

| | | | | |
|---|---|---|---|---|
| 6,020,884 A | * | 2/2000 | MacNaughton et al. | 715/747 |
| 6,044,205 A | * | 3/2000 | Reed et al. | 709/201 |
| 6,078,948 A | * | 6/2000 | Podgorny et al. | 709/204 |
| 6,094,675 A | * | 7/2000 | Sunaga et al. | 709/204 |
| 6,167,395 A | * | 12/2000 | Beck et al. | 707/3 |
| 6,219,045 B1 | * | 4/2001 | Leahy et al. | 715/757 |
| 6,230,185 B1 | * | 5/2001 | Salas et al. | 709/205 |
| 6,336,133 B1 | * | 1/2002 | Morris et al. | 709/204 |
| 6,401,122 B1 | * | 6/2002 | Matsui et al. | 709/227 |
| 6,433,795 B1 | * | 8/2002 | MacNaughton et al. | 715/738 |
| 6,438,580 B1 | * | 8/2002 | Mears et al. | 709/204 |
| 6,460,036 B1 | * | 10/2002 | Herz | 707/10 |
| 6,480,885 B1 | * | 11/2002 | Olivier | 709/207 |
| 6,484,196 B1 | * | 11/2002 | Maurille | 709/206 |
| 6,493,703 B1 | * | 12/2002 | Knight et al. | 707/3 |
| 6,519,629 B2 | * | 2/2003 | Harvey et al. | 709/204 |
| 6,581,096 B1 | * | 6/2003 | Cottrille et al. | 709/223 |
| 6,643,681 B1 | * | 11/2003 | Saito et al. | 709/202 |
| 6,742,032 B1 | * | 5/2004 | Castellani et al. | 709/224 |
| 6,766,321 B2 | * | 7/2004 | Sasaki et al. | 707/8 |
| 6,772,195 B1 | * | 8/2004 | Hatlelid et al. | 709/204 |
| 6,804,675 B1 | * | 10/2004 | Knight et al. | 707/10 |
| 6,807,566 B1 | * | 10/2004 | Bates et al. | 709/206 |
| 2001/0003189 A1 | * | 6/2001 | Miyazawa et al. | 709/206 |
| 2001/0056465 A1 | * | 12/2001 | Aiso | 709/203 |
| 2002/0019829 A1 | * | 2/2002 | Shapiro | 707/201 |

FOREIGN PATENT DOCUMENTS

JP  11-045279  * 2/1999

OTHER PUBLICATIONS

Slashdot.org FAQ—Jun. 2000.*
eGroups.com—May 2000.*

(Continued)

*Primary Examiner*—Bradley Edelman
*Assistant Examiner*—Sean Reilly
(74) *Attorney, Agent, or Firm*—Bell, Boyd & Lloyd LLC

(57) ABSTRACT

A method and an information processing apparatus are provided for efficiently advertising a community provided in a virtual space. A user transmits a request for generating a community in a virtual space. Data relating to a community is newly generated and stored. Greeting sentences are thereafter sent to communities that are near the newly generated community in a virtual positional relationship of a virtual space.

16 Claims, 19 Drawing Sheets

OTHER PUBLICATIONS

Hardvard Medical School, AnIntroductory Guide to Message Boards—Mar. 9, 1999.*

Goldberg et al., An Update on WebCT (World-Wide-Web Course Tools), Jun. 1997.* bulletinboards.com—Jul. 2000.*

Anyboard, Administration and Setup Manual for Any board WWW Message Board System, Aug. 2000.*

* cited by examiner

XXX CLUB ENTRANCE QUESTIONNAIRE

1. HOW DID YOU KNOW THIS CLUB?

2. WHAT IS YOUR FAVORITE SOCCER TEAM?

3. WHAT DO YOU EXPECT OF THIS CLUB?

4. AT WHAT FREQUENCY WILL YOU ACCESS THIS CLUB?

5. YOUR REQUESTS

FIG. 12

BULLETIN BOARD OF COMMUNITY XX

| NAME: A | 2000.10.10 22:33:00 | TITLE: AS TO XX | EVALUATION: GOOD EVALUATION: BAD |
|---|---|---|---|
| I WISH REPLIES FROM PERSONS WHO KNOW ABOUT XX. | | | IMAGE |

WRITE A REPLY

| NAME: B | 2000.10.10 22:32:00 | TITLE: XXX | EVALUATION: GOOD EVALUATION: BAD |
|---|---|---|---|
| XXXXXX | | | IMAGE |

WRITE A REPLY

51

ADVERTISING AND MANAGING COMMUNITIES WITHIN A VIRTUAL SPACE

BACKGROUND OF THE INVENTION

1. Field of the Invention

The present invention relates to an information processing apparatus and a community managing method. In particular, the invention relates to an information processing apparatus and a community managing method that are suitable for use in management of a community or a bulletin board in a virtual space.

2. Description of the Related Art

With recent spread of the Internet, a number of sites called homepages (Web pages) or the like have been established on the Internet by users of the Internet. The number of homepages is now increasing. Many homepages employ a service known as a bulletin board in which a user who visits the homepage can freely write a message to a "bulletin board" that may be read by others and read messages written and posted on the bulletin board by others.

Services of another kind exist on the Internet in which users having a common interest form a community (homepage) and they exchange information within the community. Such communities usually employ a membership system and members can use services such as the bulletin board mentioned above. In such a bulletin board system, a message that is sent, via the Internet, from a person who wants to have the message placed on the bulletin board is converted into a fixed-form image data and the image data is opened on the Internet.

The Internet has an enormous number of homepages and hence has a very large number of bulletin board services. This results in a problem that it is difficult for a user who has established a bulletin board in his own homepage to make a large number of users aware of its presence. If the existence of a bulletin board is not widely known, the number of messages written on the bulletin board is limited and activity on the bulletin board is reduced. Even when the presence of a bulletin board is widely known, if there is only a small number of written messages, users will recognize the inactivity and lose interest in the Web site and stop visiting it. Another problem that may arise is that a large part of users may browse a bulletin board but few will write messages. Thus, the number of written messages again becomes small and the service becomes inactive.

A bulletin board becomes active as replies to written messages are posted one after another. However, locating messages for which replies have not been posted, in other words, stale messages that appear to make a bulletin board inactive, requires recognition of the structure of written messages themselves, a process which takes time and labor. Further, a bulletin board must owner continuously manage the bulletin board in order to keep it orderly and easy to browse. Again, time consuming and laborious work.

For example, if the contents of a message written on a bulletin board are inappropriate, the manager needs to eliminate the message. Eliminating inappropriate messages while monitoring the entire bulletin board imposes a heavy load on the owner.

On a bulletin board that is provided in a community, only the members are allowed to write a message to and to read messages. A problem with bulletin boards is that even if the owner of a bulletin board wants to open discussions on the bulletin board widely to users other than members of the community, it is impossible to impose restrictions such as allowing only the members to write a message that may be read by all users, including those who are not members of the community.

There are also services in existence in which a message can be written to a bulletin board by e-mail. A problem with this method is that, although only the members are usually allowed to write a message to a bulletin board provided in a membership community as described above, non-member users can write messages by falsely inputting the name of a member in the "from" field (transmission source row) of an e-mail.

Where messages are written to a bulletin board by e-mail, it is possible to analyze the message on the bulletin board that a response e-mail is directed to (i.e., the prior message has been written to) as long as both messages are e-mail messages. However, this type of analysis is impossible when one or more of the messages has no mail header, such as the case when a message is directed to the bulletin board from the Web.

Further, where e-mails are exchanged between members of a community, there is a problem that their mail addresses are opened to the other members of the community and hence the security of members who do not want their mail addresses known (opened) to other members cannot be protected. There is another problem that when the owner of a community wants to know information about a member who is going to join or withdraw from the community. Often, it is necessary for the owner to contact the member by e-mail or the like which the owner cannot easily do if such information is not readily available.

Another problem in managing a community bulletin board is that even if the owner forces a member who behaves inappropriately to withdraw from a community, the same user can be registered as a member again.

SUMMARY OF THE INVENTION

The present invention has been made in view of the above circumstances in the art, and an object of the invention therefore is to solve the above problems by providing virtual positional information and performing such operations as sending greeting sentences to nearby communities when a community is newly generated in a virtual space established and informing its owner of the presence of a bulletin board having only a small number of written messages.

A first aspect of the invention provides an information processing apparatus for managing a community that is constructed via a network. The information processing apparatus includes a bulletin board for enabling information exchange between members of the community. According to this aspect of the invention, a setting may be made on the apparatus to determine whether only the members of the community should be permitted to write to and/or read from the bulletin board or whether users other than the members of the community should also be permitted to write to and/or read from the bulletin board.

A second aspect of the invention provides an information processing apparatus for managing a plurality of communities in a virtual space. The information processing apparatus includes a first storage device which stores pieces of positional information of the respective communities located within the virtual space. A second storage device is provided for storing information relating to bulletin boards that are provided within the communities. Positional information of a newly generated community is stored in the first storage device, and information relating to the newly generated community and information to be written to bulletin boards of communities that are near the newly generated community within the virtual space is generated and stored in the second storage device.

A third aspect of the invention provides a community managing method for managing a plurality of communities in a virtual space. The method includes the step of controlling storage of pieces of positional information of the respective communities in the virtual space. A second step involves controlling the storage of information relating to bulletin boards that are provided in the communities. Finally, the method calls for the generation of information relating to a newly generated community which is to be written to bulletin boards of nearby communities that are near the newly generated community in the virtual space, and sending the generated information to the nearby communities.

Additional features and advantages of the present invention are described in, and will be apparent from, the following Detailed Description of the Invention and the figures.

BRIEF DESCRIPTION OF THE FIGURES

FIG. 11 is an example of an entrance questionnaire that is displayed on the display device;

FIG. 12 is an example of a bulletin board that is displayed on the display device;

DETAILED DESCRIPTION OF THE INVENTION

Figure 1:
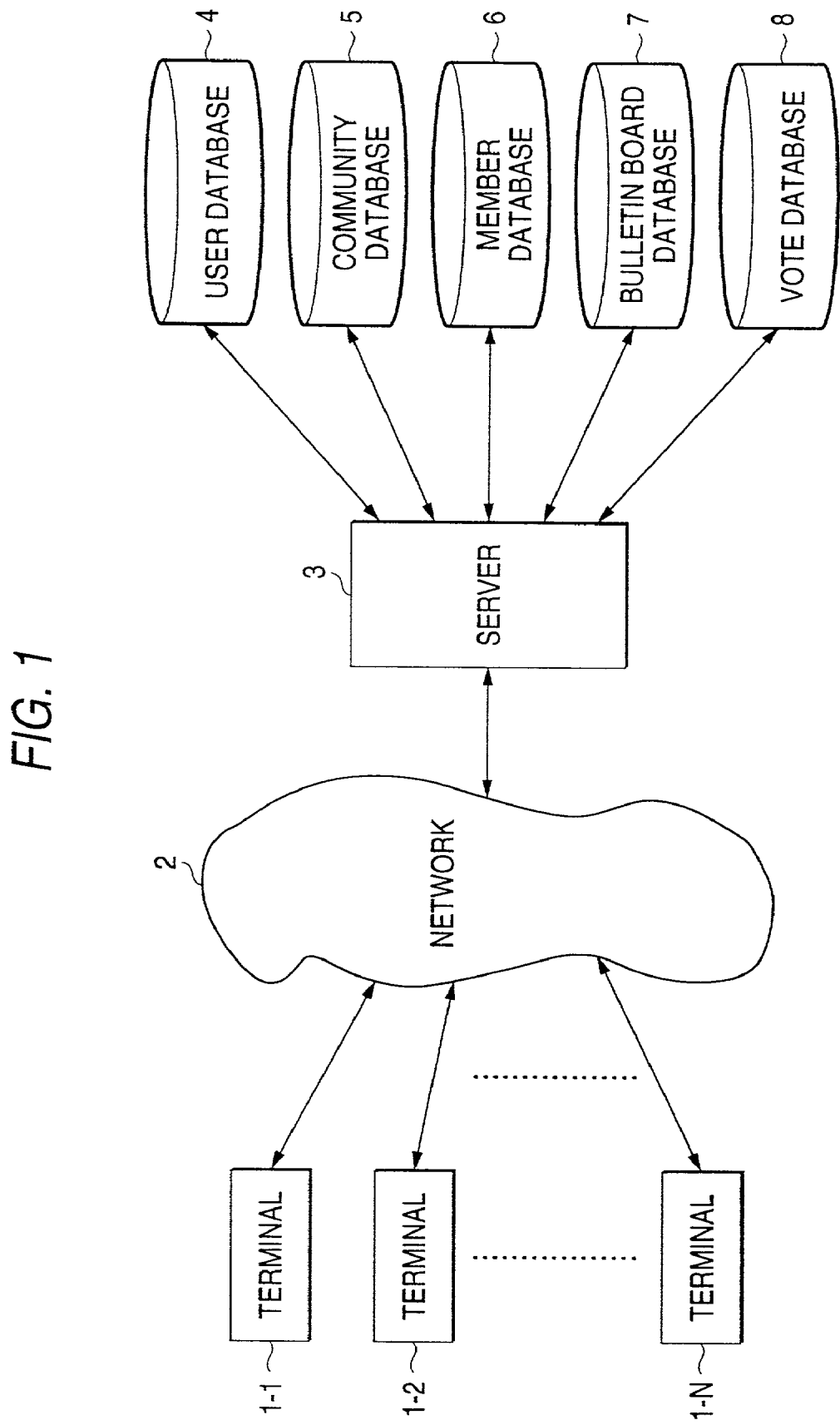
FIG. 1 is a block diagram showing the configuration of a system according to an embodiment of the present invention.

An embodiment of the present invention will be hereinafter described with reference to the accompanying drawings. FIG. 1 is a block diagram showing the configuration of a system according to the embodiment of the invention. Terminals 1-1 to 1-N are connected to a network 2 as typified by the Internet. The terminals 1-1 to 1-N (hereinafter referred to simply as "terminals 1" if they need not be discriminated from each other) are user-side terminals such as personal computers or cell phones.

A server 3 for providing and managing a virtual space or a service such as a bulletin board provided in the virtual space is also connected to the network 2. Connected to the server 3 are a user database 4 in which information of the users of the terminals 1-1 to 1-N is stored, a community database 5 in which information relating to communities (described later) is stored, a member database 6 in which information relating to the members of each community is stored, a bulletin board database 7 in which information relating to a bulletin board provided in each community is stored, and a vote database 8 for storing, for example, a result of a vote of members on the content of a message written on each bulletin board.

Figure 2:
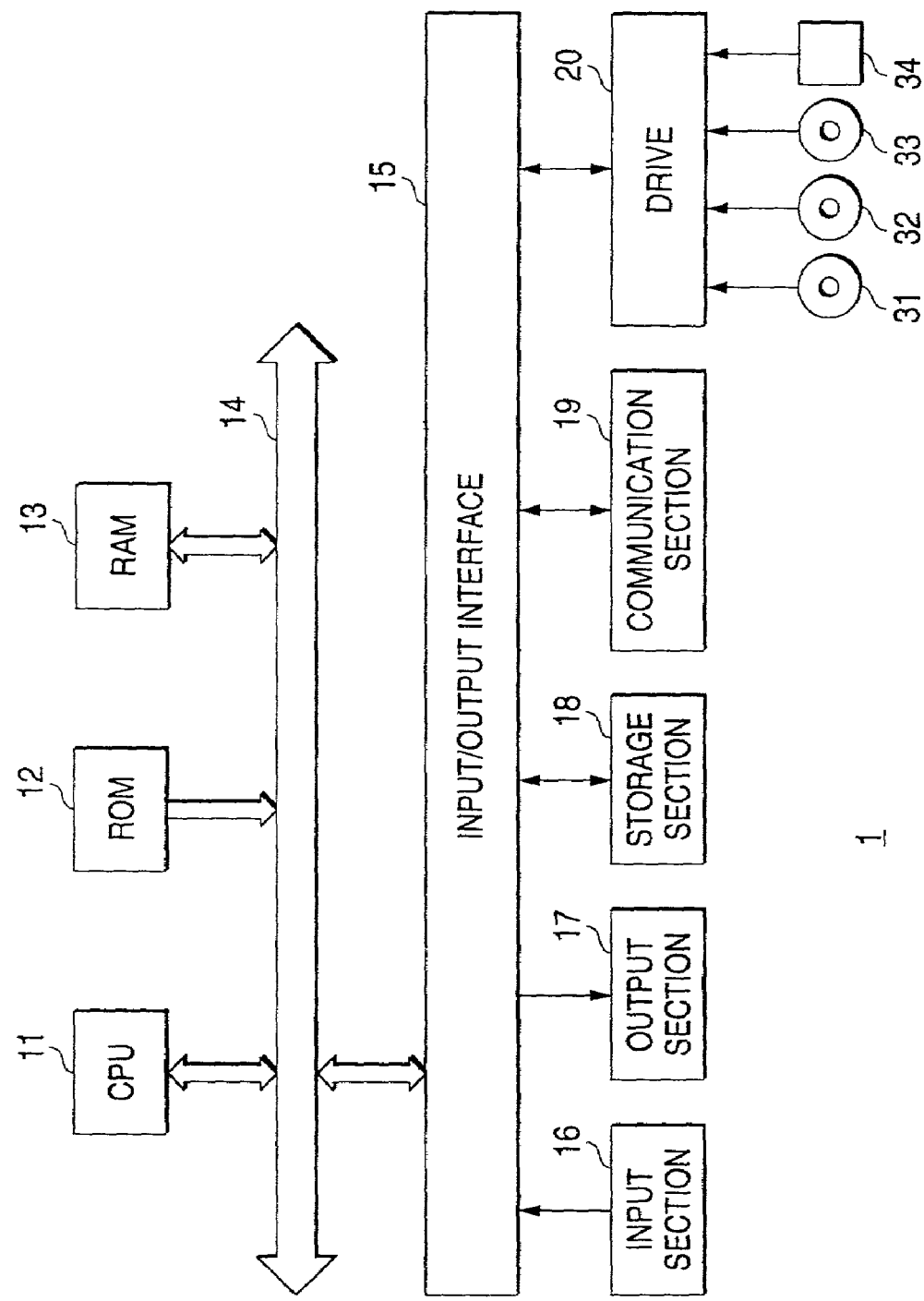
FIG. 2 is a block diagram of the internal configuration of each of the terminals shown in FIG. 1.

FIG. 2 shows the internal configuration of each terminal 1. A central processing unit (CPU) 11 of the terminal 1 performs various kinds of processing according to programs stored in a read-only memory (ROM) 12. Data, a program, or the like, necessary for the CPU 11 to perform one of various kinds of processing is stored in a random access memory (RAM) 13 when necessary. An input section 16 including a keyboard and a mouse is connected to an input/output interface 15. The input/output interface 15 outputs a signal to the CPU 11 that is input through the input section 16. An output section 17 including a display device and a speaker is also connected to the input/output interface 15. Also connected to the input/output interface 15 are a storage section 18 such as a hard disk drive or the like, and a communication section 19 for exchanging data with the server 3 via the network 2. A drive 20 is used in writing or reading data to or from a recording medium such as a magnetic disk 31, an optical disc 32, a magneto-optical disc 33, or a semiconductor memory 34.

The basic configuration of the server 3 is similar to that of each terminal 1 and hence is not illustrated.

Figure 3A:
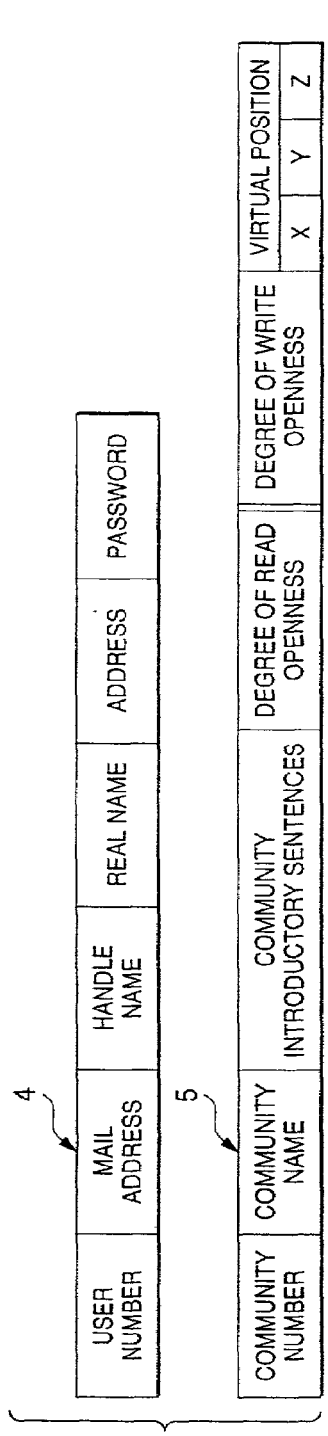
FIGS. 3A–3E are block diagrams depicting data that are stored in respective databases of FIG. 1.

Data stored in each database will be described below with reference to FIGS. 3A–3E. FIG. 3A shows data that is stored in the user database 4. A number assigned to each user, or more particularly to each terminal 1 for identifying each user, is stored as a "user number." (Although the term "number" is used here, any information enabling identification, hereafter ID information such as a symbol may be used. The same broad definitions may also be applied to the term "number" as it appears below for other identification purposes.) An e-mail address of the user corresponding to the "user number" is stored as a "mail address."

A name that will be displayed together with a written message when the message is written to a bulletin board is stored as a "handle name." The real name and the address of the user are stored as a "real name" and an "address," respectively. A password that was set by the user himself or assigned by the server 3 and which will be used when, for example, the user receives a service from the server 3, is stored as a "password."

Figure 3B:
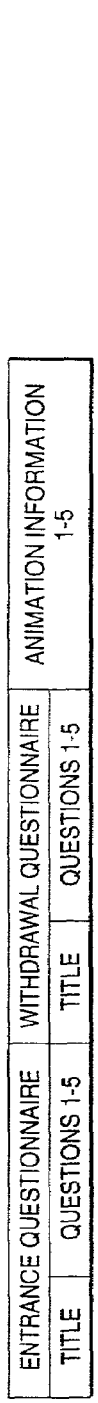
Figure 4:
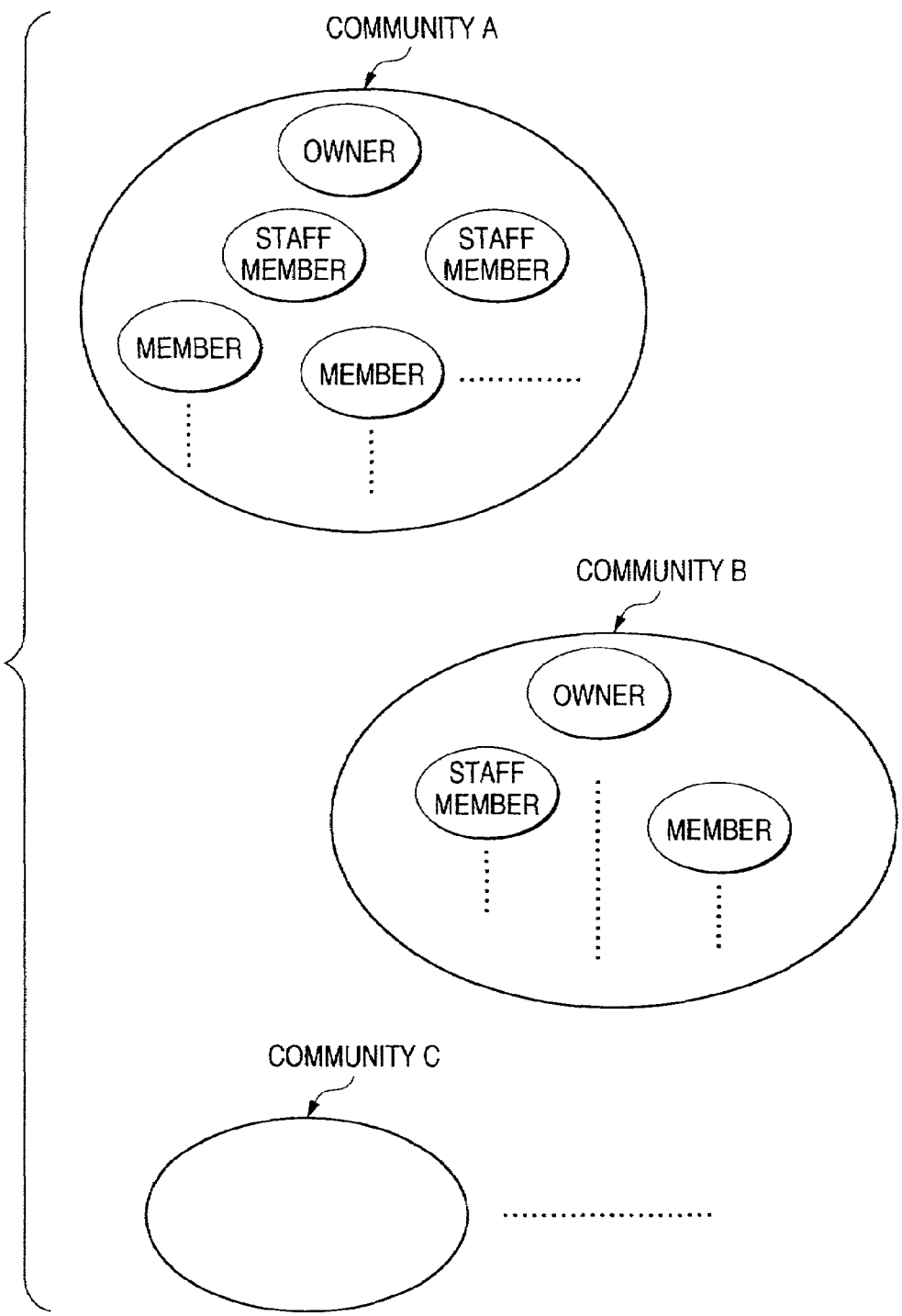
FIG. 4 is a diagram illustrating the concept of community.

FIG. 3B shows data that is stored in the community database 5. An ID number assigned to each community is stored as a "community number." The community itself will be described below. FIG. 4 illustrates the concept of community. The server 3 manages a virtual space where a plurality of communities exist. Each community is a collection of users having a common same interest, for example. One owner exists in each community.

The owner is authorized to perform acts that the other users cannot, such as deletion of a message written on a bulletin board. The owner can appoint one or more staff members who have the same authority as the owner. The users other than the owner and the staff members exist as ordinary members of the community.

Since a plurality of communities exist in the virtual space, the communities are given respective community identification numbers. A name given to each community is stored as "community name" (see FIG. 3B) data that is stored in the community database 5. Introductory sentences that explain the community (statements describing the kind of interest shared by the users who constitute the community) to users other than the members of the community are stored as "community introductory sentences."

A flag indicating whether users other than the members of the community are allowed to read messages written on a bulletin board that is provided within the community is stored as a "degree of read openness." A flag indicating whether users other than the members of the community are allowed to write messages to a bulletin board that is provided within the community, whether the members of the community are allowed to write messages by e-mail, or like information is stored as a "degree of write openness."

Figure 5:
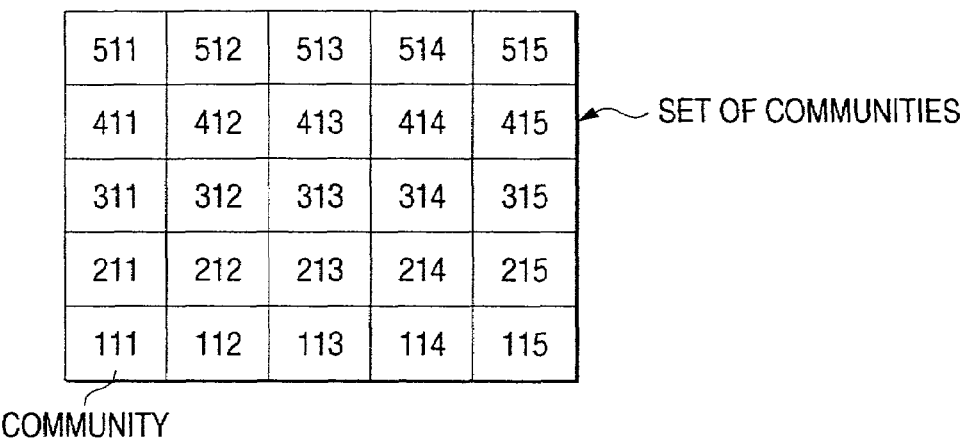
FIG. 5 is a diagram showing how communities are arranged in a virtual space.

Data relating to the position of the community within the virtual space is stored as a "virtual position." As shown in FIG. 5, in this embodiment it is assumed that a set of communities forms a virtual space, such as for example, a space like an apartment house wherein the rooms of the apartment house are assigned to the respective communities. The position of each community within such a virtual space is stored as a "virtual position."

The questions of a questionnaire that a user is requested to answer when he joins the community and becomes a member are stored as an "entrance questionnaire." In the example of FIG. 3B, an entrance questionnaire having five questions is stored. Likewise, the questions of a questionnaire that a user is requested to answer when he withdraws from the community are stored as a "withdrawal questionnaire."

Data relating to an animation (a moving picture or a still picture) to be displayed together with a written message when the message is written to a bulletin board are stored as "animation information." In the example of FIG. 3B, data relating to five animations are stored.

Figure 3C:
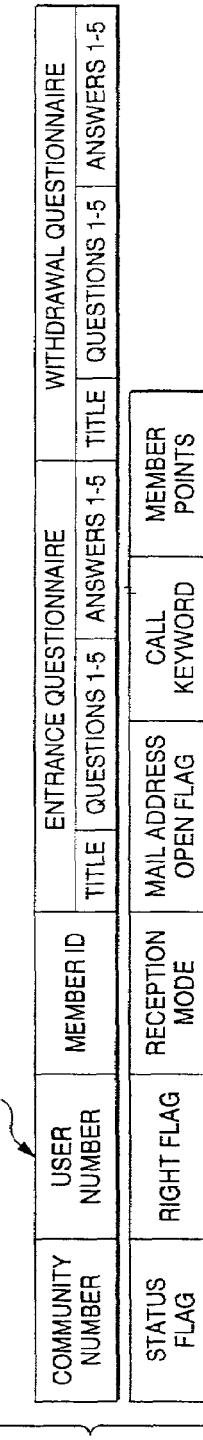

FIG. 3C shows data that is stored in the member database 6. Data indicating who is a member of which community is to be stored in the member database 6. To this end, the "community number" of a community to which a user belongs and his "user number" are stored in the member database 6.

A "member ID" is a number that is unique in the community and is assigned to each member for identification. A result of the entrance questionnaire that is provided in the community and was answered by the member at the time of entrance is stored as an "entrance questionnaire result." A result of the withdrawal questionnaire that is provided in the community and was answered by the user at the time the user withdraws, if he withdraws, is stored in a "withdrawal questionnaire result."

Data indicating whether the user is a current member, has withdrawn from the community, or is registered as a user who is not permitted registration is stored as a "status flag." Data indicating whether the member is an owner, a staff member, an ordinary member is stored as a "right flag". Data indicating whether the member acquires a message on a bulletin board by e-mail is stored as a "reception mode."

A flag indicating whether the mail address should be opened when the member sends an e-mail to another member of the community is stored as a "mail address open flag." A keyword that was set by the member is stored as a "call keyword." When a message having the same keyword as that stored as the "call keyword" is written to a bulletin board, the member is notified by e-mail. When the member writes a message to a bulletin board, the owner evaluates the written message (this process is described later in detail). Evaluation points are stored as "member points."

Figure 3D:
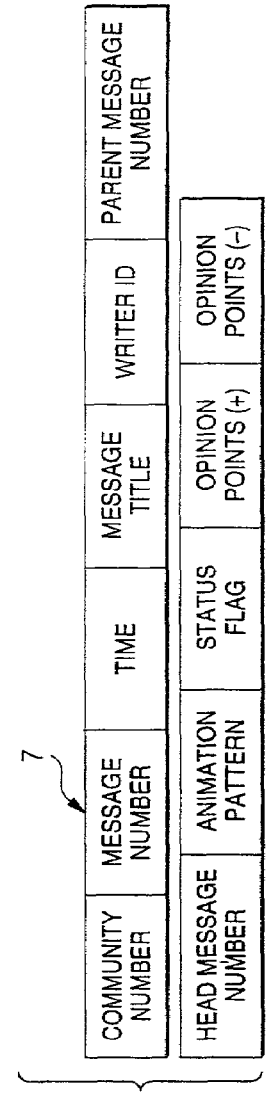

FIG. 3D shows data that is stored in the bulletin board database 7. Data indicating a community in which the bulletin board is provided is stored as a "community number." A number that is assigned to each message written on the bulletin board for identification purposes is stored as a "message number." A time stamp indicating when the message was written to the bulletin board is stored as "time."

A title of the written message is stored as a "message title." The member ID of the member who wrote the message is stored as a "writer ID." If the written message is a reply to another message, the message number of the parent message is stored as a "parent message number" and the number of a message that initiated a topic of related messages is stored as a "head message number."

Data relating to an animation that is attached to the written message is stored as an "animation pattern." A flag indicating whether the message has been deleted is stored as a "status flag." Points of evaluations by other members on the written message (described later in detail) are stored as "opinion points (+)" and "opinion points (−)."

Figure 3E:
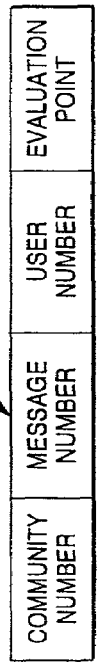

FIG. 3E shows data that is stored in the vote database 8. One message that is written on the bulletin board of a certain community is determined by a "community number" and a "message number." The user who wrote the thus-determined message is determined by a "user number." A point of evaluation by another user on the message is stored as an "evaluation point."

Figure 6:
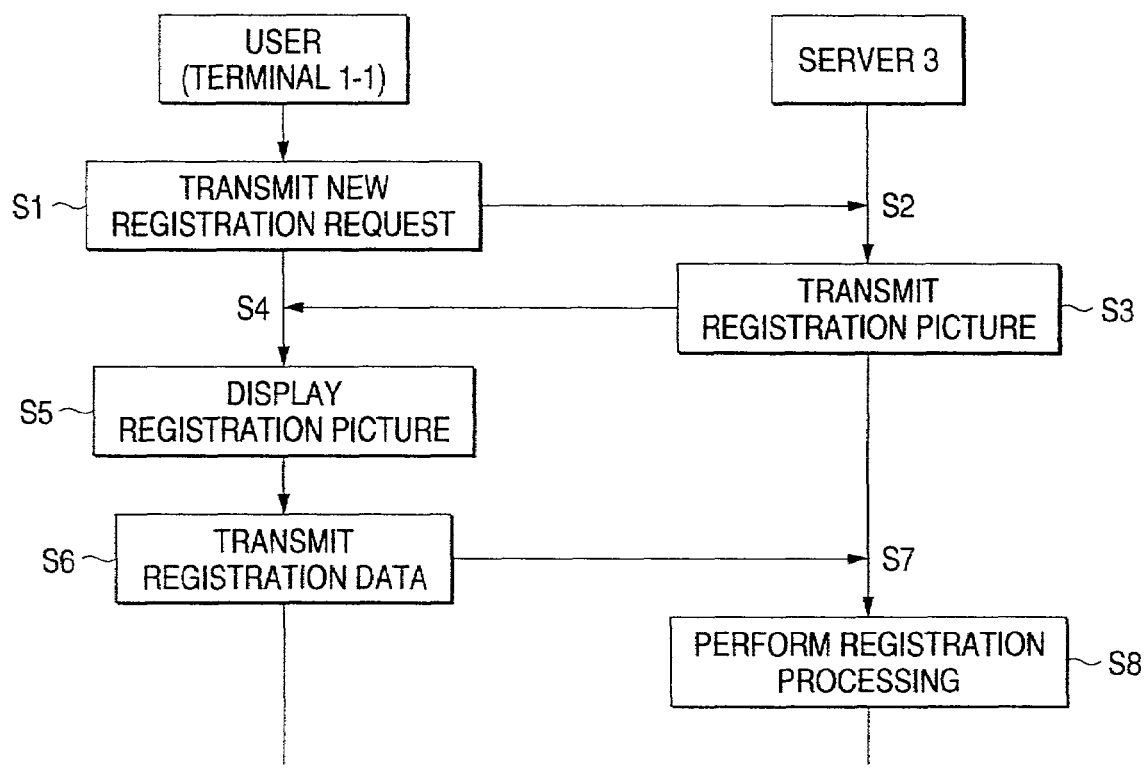
FIG. 6 is a flowchart showing a user registration operation.

The operation of the system of FIG. 1 including the above databases will be described below. First, user registration will be described with reference to a flowchart of FIG. 6. At step S1, a user who wants to register causes his own terminal 1 (assumed here to be the terminal 1-1) to access the server 3 via the network 2 and transmits a new registration request to the server 3.

Figure 7:
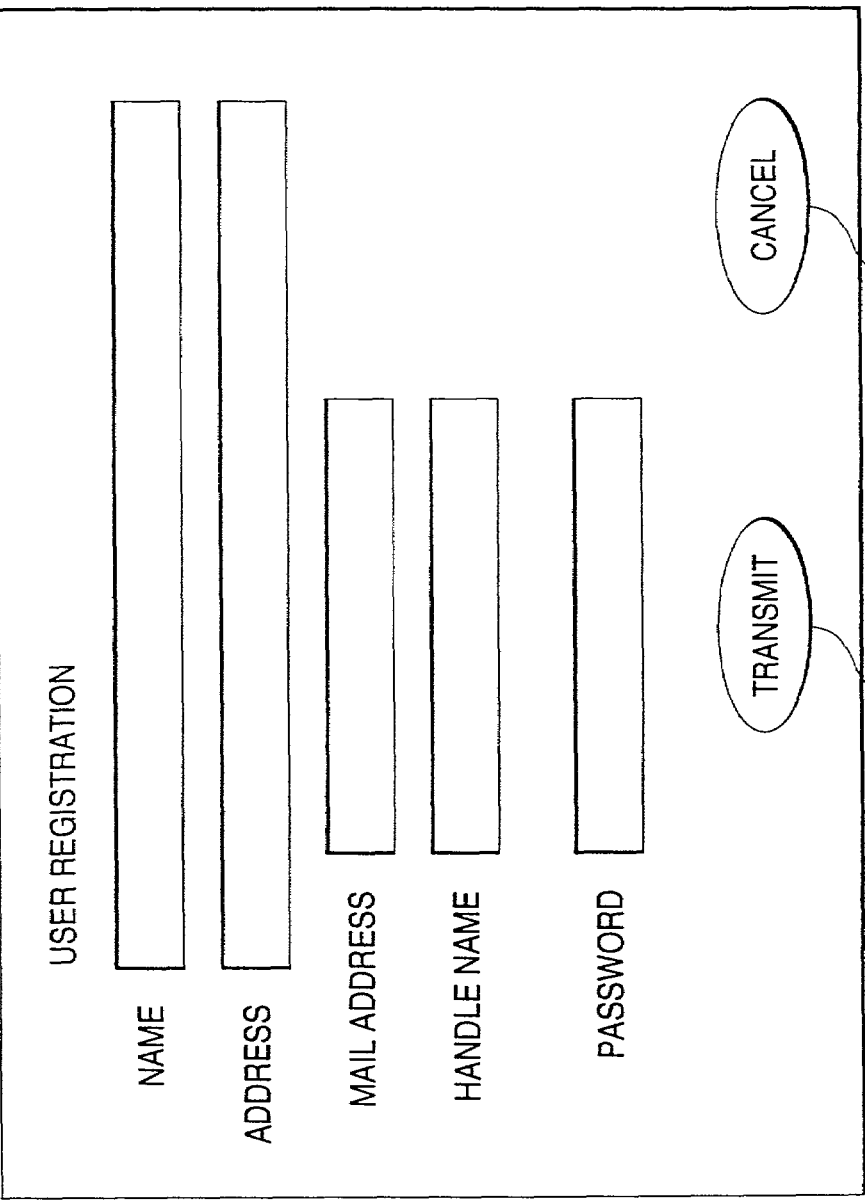
FIG. 7 is an example picture that is displayed on a display device.

The server 3 receives the new registration request from the terminal 1-1 at step S2 and transmits data of a picture for new registration to the terminal 1-1 at step S3. This terminal 1-1 receives the data from the server 3 at step S4, and at step S5 displays a picture based on the received data on the display device of the output section 17. FIG. 7 shows an example of the picture that is displayed on the display device.

The user registration picture is a picture for collecting data to be stored in the user database 4 (see FIG. 1), that is, data as shown in FIG. 3A. Therefore, as shown in FIG. 7, the user registration picture has fields for entering a "name," an "address," a "mail address," a "handle name," and a "password." A transmission button 61-1 is provided under these fields for ordering the transmission of input data to the server 3 and a cancellation button 61-2 for ordering the interruption of the user registration.

After the picture shown in FIG. 7 is displayed on the user-side terminal 1-1 and the user has input the data and manipulated the transmission button 61-1, the terminal 1-1 transmits the input data to the server 3 at step S6. Receiving the data at step S7, the server 3 registers the received data in the user database 4 at step S8. The user becomes a newly registered member in this manner. If the cancellation button 61-2 is manipulated during the registration, step S6 and the subsequent steps are not executed and the operation of registering the new user is interrupted.

Figure 8:
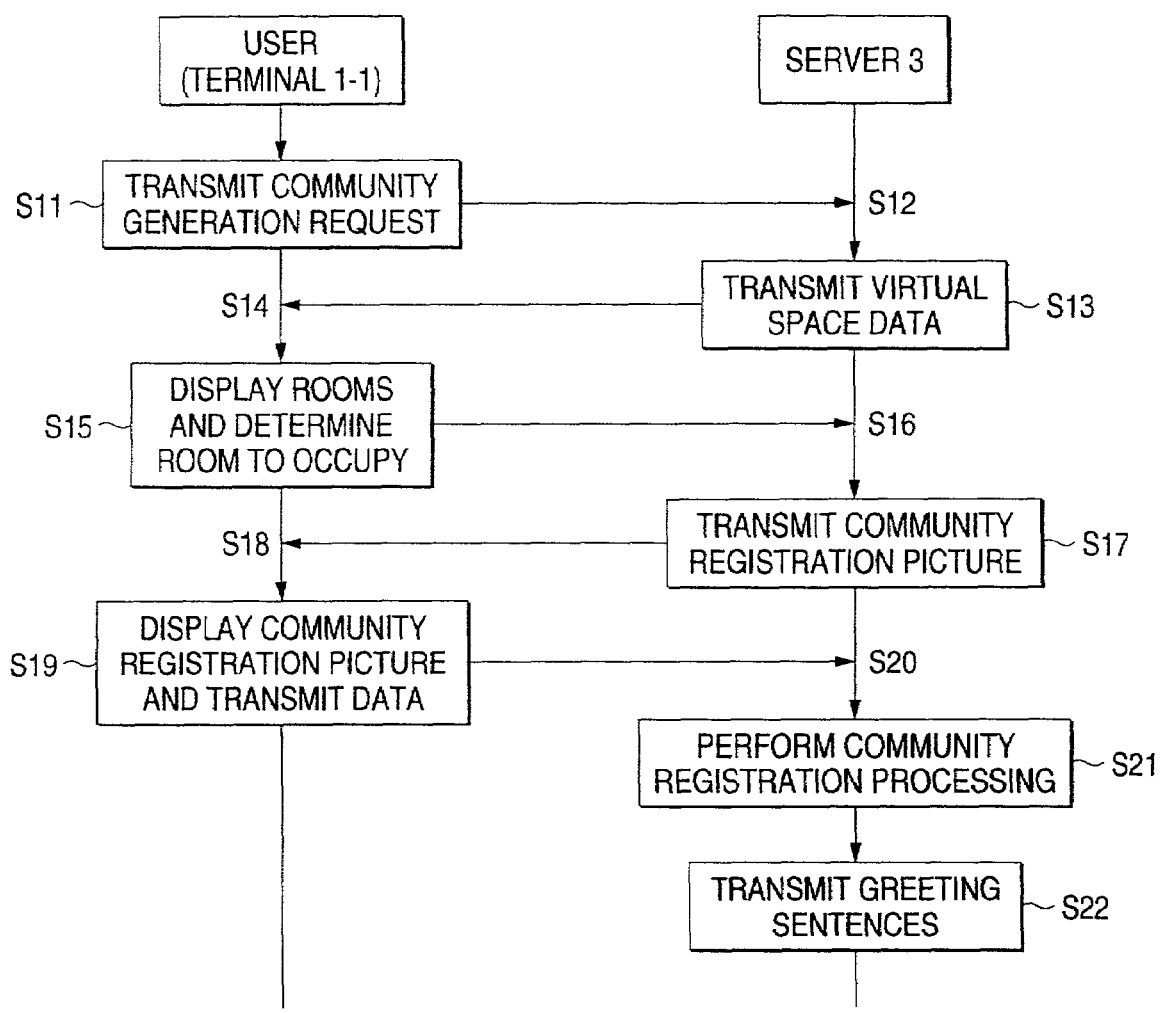
FIG. 8 is a flowchart showing a community generating operation.

An operation that is performed when a user who has already been registered generates a community will be described below with reference to the flowchart of FIG. 8. At step S11 a user transmits a community generation request to the server 3 by manipulating the terminal 1-1. It is assumed that a connection between the terminal 1-1 and the server 3 has already been established when the user transmits the community generation request and that user authentication processing was performed at the time the connection was established. Hence, the user has already been authenticated. At this point the user is at a state where he can transmit the community generation request by performing a prescribed manipulation.

Receiving the community generation request from the terminal 1-1 at step S12, the server 3 transmits virtual space data to the terminal 1-1 at step S13. The terminal 1-1 receives the virtual space data from the server 3 at step S14 and displays a virtual space on the display device 51 based on the received data at step S15.

An analogy of the virtual space display is the space created by a collection of rooms like those of an apartment house (see FIG. 5). As described previously in connection with FIG. 5, each room corresponds to a respective community. The room numbers of rooms that are occupied by a community and those of rooms that are not occupied by any community are displayed in different colors, for example, so as to be discriminated one from another. Alternatively, community names may be displayed, for example, under respective room numbers so as to make it possible to recognize whether each room is occupied by a community by the presence or absence of a community name.

The user who sent the community generation request for generating a new community determines a room to occupy by performing a prescribed manipulation such as clicking on one of the room numbers having an indication that the room is not occupied by a community. The system may be configured in a manner such that rooms adjacent to each other are occupied by communities that are formed by members having similar interests. However, not configuring the system in such a manner (not classifying the rooms into genres) and thereby allowing a user to select a room freely, causes communities with members having various interests to gather in a narrow range of the virtual space, as a result of which the range of selection is increased when the user selects a room.

When a room that is to be occupied is determined in the above manner at step S15, the resulting data are transmitted to the server 3. The server 3, upon receiving the data from the terminal 1-1 at step S16, transmits data of a community registration picture to the terminal 1-1 at step S17. Receiving the data from the server 3 at step S18, the terminal 1-1 displays a community registration picture on the display device 51 based on the received data at step 19.

Figure 9:
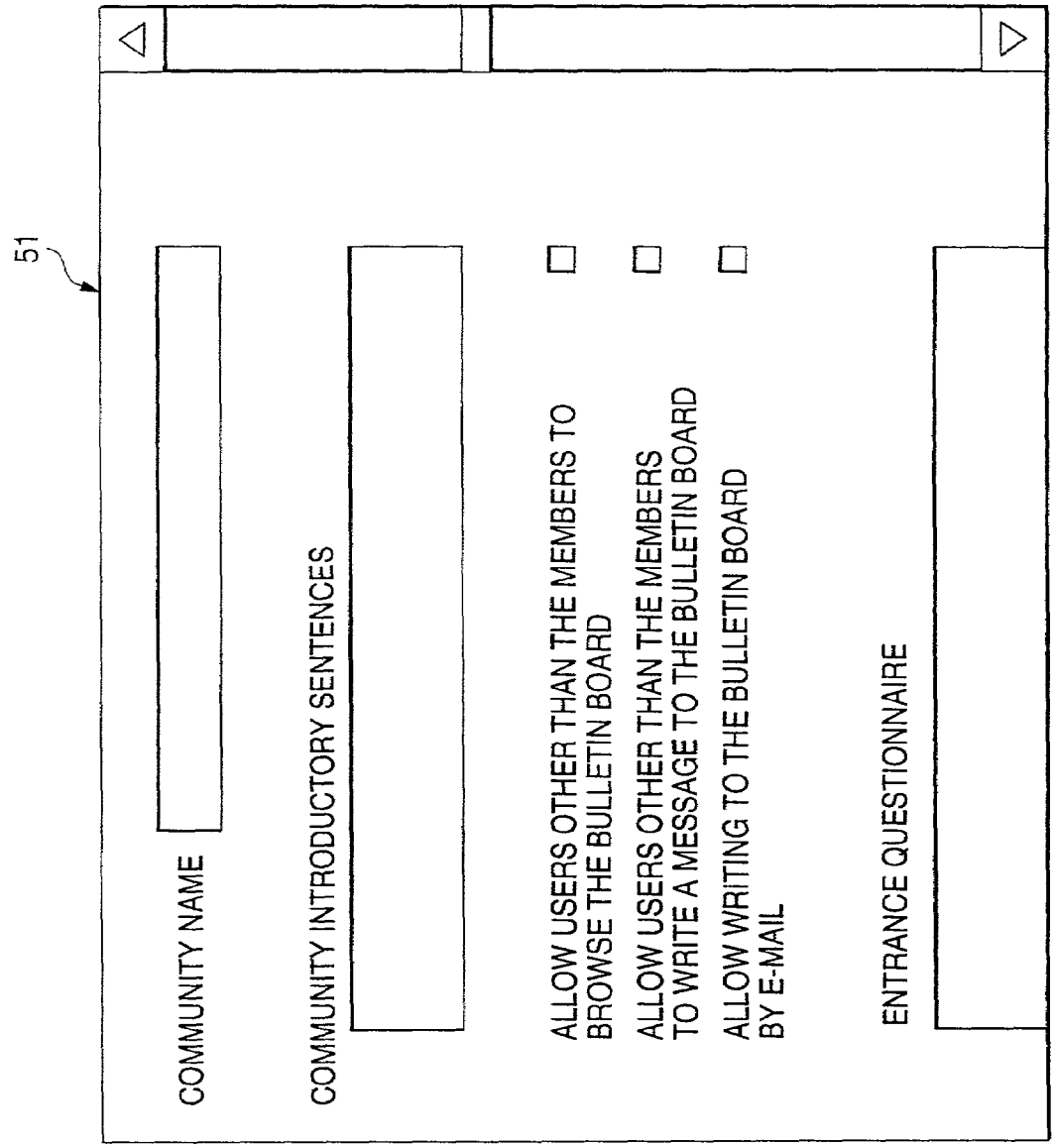
FIG. 9 is an example picture that is displayed on the display device.

FIG. 9 shows an example of a community registration picture that is displayed on the display device 51 at step S19. The community registration picture is a picture for collecting data to be stored in the community database 5 (see FIG. 1), that is, data as shown in FIG. 3B. Therefore, fields for entering a "community name," "community introductory sentences," etc. are displayed as shown in FIG. 9. As described previously, the "degree of read openness" is data indicating whether to allow users other than the members of the community to browse the bulletin board of the community. Therefore, for example, a check item "Allow users other than the members to browse the bulletin board" is provided as shown in FIG. 9.

Similarly, to acquire data of the "degree of write openness," check items "Allow users other than the members to write a message to the bulletin board" and "Allow writing to the bulletin board by e-mail" are also provided as shown in FIG. 9. As shown in FIG. 3B, data to be stored in the community database 5 also includes an "entrance questionnaire," a "withdrawal questionnaire," and "animation information." These data can be input by scrolling a picture being displayed on the display device 51.

If the user manipulates a transmission button (not shown) after inputting the necessary data, the community registration data are transmitted to the server 3. Terminal 1-1 receives the data at step S20. At step S21 the server 3 performs community registration processing, that is, the server stores the received data in the community database 6.

After the new community is generated in the specified room in the virtual space, greeting sentences are transmitted to the communities occupying rooms near the room of the newly generated community at step S22. For example, if a new community is generated in the room having the room number "313" in the virtual space having the room arrangement of FIG. 5, the greeting sentences are transmitted to the communities of the nearby rooms having the room numbers "212," "213," "214," "312," "314," "412," "413," and "414."

Naturally, the nearby rooms to whose communities the greeting sentences are transmitted may be rooms in a wider range rather than only the adjacent rooms, or may be only the rooms on the right side and the left side of the room of the newly generated community. The greeting sentences are not transmitted to rooms that are not occupied by any community.

The greeting sentences are written to the bulletin board of each community that has received the greeting sentences. It may be that the owner of a bulletin board will be offended if he finds an advertisement for another person's bulletin board on his own bulletin board. However, in real societies, a person who has moved to a new place usually greets those in the neighborhood. It is expected that the owner of a bulletin board will not be offended by, but favorably accept the greeting sentences that are written on his bulletin board without permission because this is an application of the above custom found in real societies to the virtual space.

Since the server 3 transmits greeting sentences to the communities of nearby rooms upon generation of a new community, the owner who has generated the new community can advertise his own community without spending time and labor. Further, this will serve to make smoother communication between communities that are near each other in the virtual geography.

Figure 10:
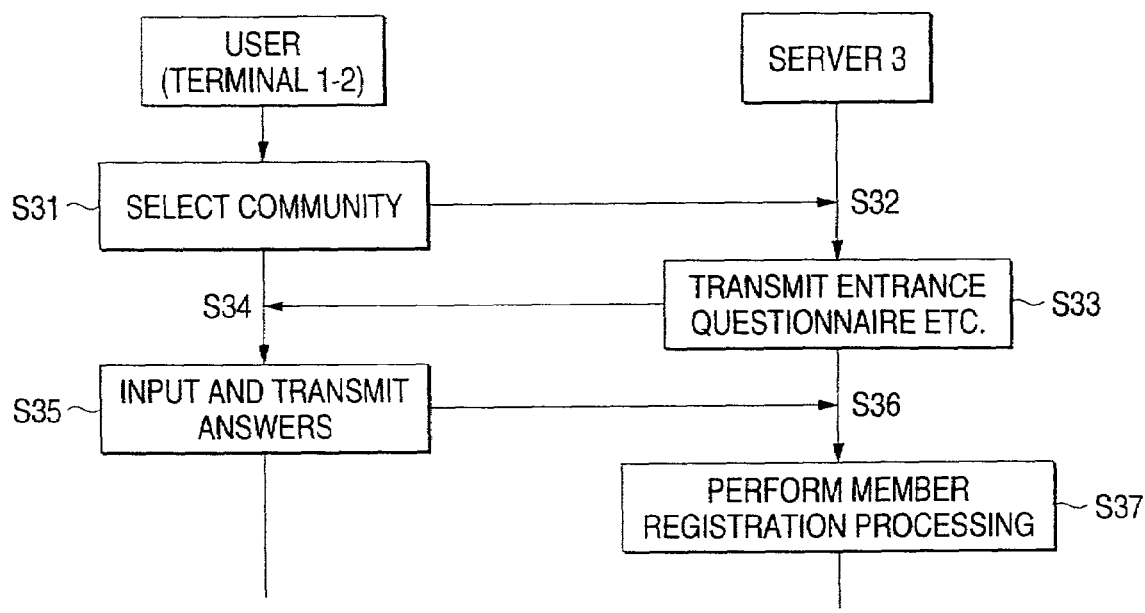
FIG. 10 is a flowchart showing an operation that is performed when a user becomes a member of a community.

An operation that is performed when a user becomes a member of a community generated in the above manner will be described below with reference to the flowchart of FIG. 10. This operation will be described for a case in which the user of the terminal 1-2 becomes a member of a community whose owner is the user of the terminal 1-1. First, at step S31, the user of the terminal 1-2 (who has already been registered as a user of the virtual space) selects a community. For example, a community is selected by selecting a desired room (community) from the set of rooms in the virtual space as shown in FIG. 5.

The system may be configured in such a manner that when the cursor (not shown) has been moved to a certain room by the user manipulating the mouse or the like to select a community, the introductory sentences of the community of the room thus specified are displayed. This allows the user to select a community by referring to its introductory sentences.

Information identifying the community selected at step S31 is received by the server 3 at step S32. At step S33, the server 3 reads the entrance questionnaire that is set for the community corresponding to the received information from the community database 5 (see FIGS. 1 and 3B) and transmits it to the terminal 1-2. In addition to the entrance questionnaire, the server 3 transmits data to be used for determining a setting as to whether the user desires to open his mail address to the other members of the community.

The terminal 1-2 receives the data from the server 3 at step S34. At step S35 the terminal 1-2 displays a picture such as the picture shown in FIG. 11 based on the received data. After the user has entered necessary information by using the displayed picture, the terminal 1-2 transmits the input information to the server 3. Receiving the input information at step S36, the server 3 next performs member registration processing, that is, stores the input information in the member database 6 (see FIGS. 1 and 3C) together with other necessary information at step S37.

Next, the process for writing to and browsing a bulletin board provided in a community will be described. A bulletin board is displayed on the display device 51 as shown in FIG. 12, for example. A community name is shown in a top portion of the screen of the display device 51. The handle name of a user who wrote a message, a date and time of the writing, a title, buttons for deciding whether a written message is good or bad, the written message itself, and an image are all shown on the bulletin board.

Each written message item is displayed based on its data stored in the bulletin board database 7. That is, when a member has written a message to a bulletin board, data as shown in FIG. 3D is newly added to (stored in) the bulletin board database 7 for the written message.

Figure 13:
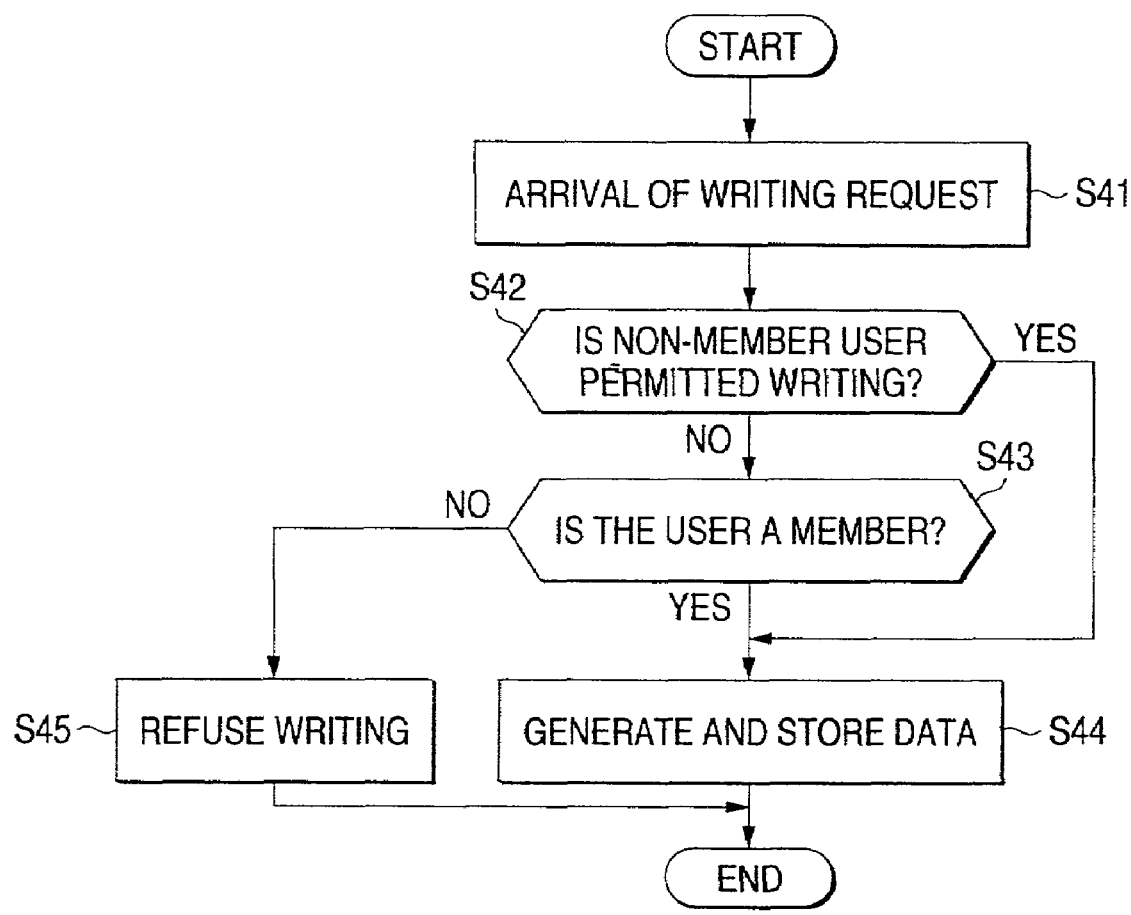
FIG. 13 is a flowchart showing an operation that relates to writing to a bulletin board.

Writing to the bulletin board may be restricted according to the "degree of write openness" (see FIG. 3B) that is stored in the community database 5. An operation of the server 3 that is performed upon reception of a write request will be described below with reference to the flowchart of FIG. 13. When a request for writing a message to a bulletin board comes from a certain user at step S41, the data relating to the degree of write openness of the community where the bulletin board is provided is read from the community database 5.

At step S42, it is judged whether a non-member user is permitted writing privileges based on the degree of write openness read-out from the community databases. If it is judged at step S42 that a non-member user is not permitted writing privileges, the process goes to step S43, where it is judged whether the user who is requesting to write a message is a member.

If it is judged at step S43 that the user who is requesting to write a message is a member or if it is judged at step S42 that a non-member user is permitted writing privileges, the process goes to step S44, where the writing request is accepted and data corresponding to the writing are generated and stored in the bulletin board database 7. On the other hand, if it is judged at step S43 that the user who is requesting writing is not a member, the process goes to step S45, where the writing request is not accepted and a message such as "Only the members are permitted to write" is transmitted to the user requesting the writing.

Another restriction on writing to a bulletin board is whether to permit writing by e-mail. This restriction is also set by the "degree of write openness" that is stored in the community database 5. If this setting is such as to not permit writing by e-mail, when a writing request to the bulletin board arrives from a user by e-mail, the request is not accepted and the processing for storing data in the bulletin board database 7 is not performed.

When a user (member) writes a message to a bulletin board, he can also register an image. As shown in FIG. 12, an image that was registered at the time of a writing is displayed, for example, on the right of a written message. Images are set in advance by the owner of the community and stored as the "animation information" in the community database 5. Images may be pictures either still pictures or moving pictures. Moving pictures may be pictures representing feelings of happiness, sadness, and anger, for example. The system is configured so that a user can select a moving picture suitable for his message.

The owner can always update the data that are stored as the "animation information" in the community database 5 and can use favorite images. Data of an image that has been selected by a user who is going to write a message is stored as the "animation pattern" (see FIG. 3D) in the bulletin board database 7 in the form of a pattern number corresponding to the image.

In the example of a display on a bulletin board as shown in FIG. 12, the buttons "Evaluation: Good" and "Evaluation: Bad" are provided in a top-right portion of each written message item. An operation that is performed by the server 3 when one of these buttons is manipulated will be described below with reference to a flowchart of FIG. 14.

At step S51, a user who is browsing the bulletin board judges whether a certain written message is good or bad and manipulates the button corresponding to his judgment. That is, the user manipulates the "Evaluation: Good" button if he judges that the written message is good, and manipulates the "Evaluation: Bad" button if he judges that the written message is bad. This will be referred to as a "vote." If such a vote is cast in the user-side terminal 1, a vote result is transmitted from the terminal 1 to the server 3.

At step S52, the server 3 judges whether the user who has just voted previously voted on the same written message. This is done by searching the vote database 8. Data as shown in FIG. 3E are stored in the vote database 8. A community is identified by the "community number." A message on the bulletin board that is provided in the identified community is identified by the "message number."

The user who has voted is identified by the "user number." The vote result of the user is stored as the "evaluation point." Searching the vote database 8 having the above data structure enables judgment as to whether the user previously voted on the same written message (i.e., whether data already exists in the vote database 8).

If it is judged at step S52 that the user did not vote on the same written message, the process goes to step S53, where a vote point is newly stored in the vote database 8. That is, data as shown in FIG. 3E is newly generated and stored. As for the vote point, plus one point is stored when the "Evaluation: Good" button has been manipulated and minus one point is stored when the "Evaluation: Bad" button has been manipulated.

At step S54, the "opinion points (+)" are updated when the "Evaluation: Good" button has been manipulated and the "opinion points (−)" are updated when the "Evaluation: Bad" button has been manipulated in the bulletin board database 7 (see FIG. 3D). The opinion points are updated in this manner and thereby total evaluation points of user's votes on the written message are calculated.

On the other hand, if it is judged at step S52 that the user previously voted on the same written message, steps S53 and S54 are skipped. This makes it possible to set a restriction that each user can vote only once on a particular written message and can prevent unfair acts such as a member voting several times on his own written message in order to make its evaluation better. The system may be configured in such a manner that if it is judged at step S52 that the user previously voted on the same written message, a message for causing the user to recognize that he has already cast a vote may be transmitted to the user terminal 1.

The manner of displaying a written message item on the bulletin board may be changed depending on the sum of the "opinion points (+)" and the "opinion points (−)" in the bulletin board database 7. For example, a written message item having a large number of points may be displayed large (message area size and font size) in conspicuous colors (text color and background color), and a written message item having a small number of points may be displayed small in less conspicuous colors (e.g., light, faint colors). Further, a written message item whose points have become smaller than a prescribed value may be deleted.

Although the operation relating to voting that has been described above with reference to the flowchart of FIG. 14 is directed to the case where the right to vote is given to every user (or member), it may be given to only the owner. An operation of the server 3 that is performed in the latter case will be described below with reference to the flowchart of FIG. 15. At step S61, the owner judges whether a certain written message on the bulletin board is good or bad. Since only the owner can evaluate, or vote on, a written message, the manner of displaying each written message item on the bulletin board need not be the one shown in FIG. 12. For example, it is not necessary to provide the buttons "Evaluation: Good" and "Evaluation: Bad" in the top-right portion of each written message item displayed on terminals 1 not belonging to the owner. Naturally, those buttons may be provided, but in which case only the owner is allowed to manipulate the buttons to execute step S61.

Where only the owner is allowed to vote, the system may be configured in such a manner that the owner can vote through his community management picture. Any mechanism may be provided to allow only the owner to vote. When the owner votes at step S61 using a mechanism provided for this purpose, resulting data are received by the server 3. The server 3 generates data to be recorded on the vote database 8 based on the received vote result and records the data on the vote database 8.

Figure 14:
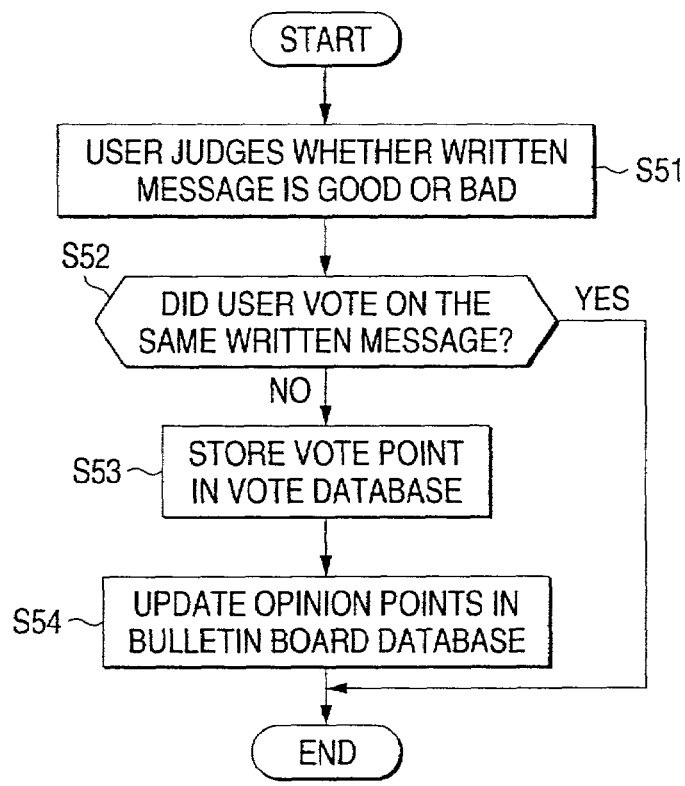
FIG. 14 is a flowchart showing an operation that relates to voting.
Figure 15:
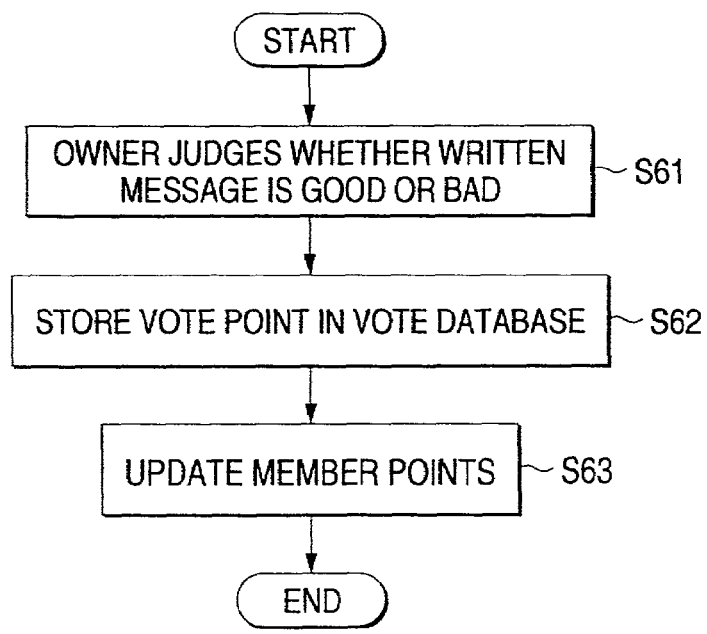
FIG. 15 is a flowchart showing another operation that relates to voting.

In this case, as in the case of step S53 in the flowchart of FIG. 14, plus one point is stored when the evaluation result is "good" and minus one point is stored when the evaluation result is "bad." Alternatively, the system may be configured so that the owner can select points from a certain point range. At step S63, the server 3 updates the "member points" (see FIG. 3C) in the member database 6. Since the "member points" are accumulated, the number of points of a member who writes good messages increases and the number of points of a member who writes bad messages decreases.

By utilizing the above voting mechanism, the system may be configured in such a manner that a member whose points have become smaller than a predefined threshold is forced to withdraw with a judgment that such a member is harmful to the community.

The manner of displaying written message items of a member on the bulletin board may be changed depending on the number of points the member has accumulated. For example, written message items of a member having a large number of member points may be displayed large in conspicuous colors, whereas written message items of a member having a small number of member points may be displayed small in less conspicuous colors. Further, written message items of a member having a small number of member points may finally be deleted (and the member forced to withdraw as described above). The number of points may be shown as star marks, for example.

As described above, providing a mechanism for allowing users or the owner to vote on written messages makes it possible to eliminate written messages that are harmful to the community and the members who write such messages. This can help keep the bulletin board active. Since each written message is evaluated in a visible manner, it is expected that a user who is going to write a message is motivated to write messages that will be well received, which will lead to activation of the bulletin board.

In a community there may be cases in which information is exchanged between members by e-mail rather than only through the bulletin board. For example, in the example of display on the bulletin board shown in FIG. 12, by clicking on a name (handle name), an e-mail can be sent to the member corresponding to the clicked name.

When a name is clicked, an application for sending e-mail is started in the user-side terminal 1. As a result, a picture such as that shown in FIG. 16 for example, is displayed on the display device 51. An e-mail destination mail address is input to an address space 71. If the e-mail should also be sent to a mail address other than the one input to the address space 71, a destination mail address is also input to a CC space 72.

Figure 16:
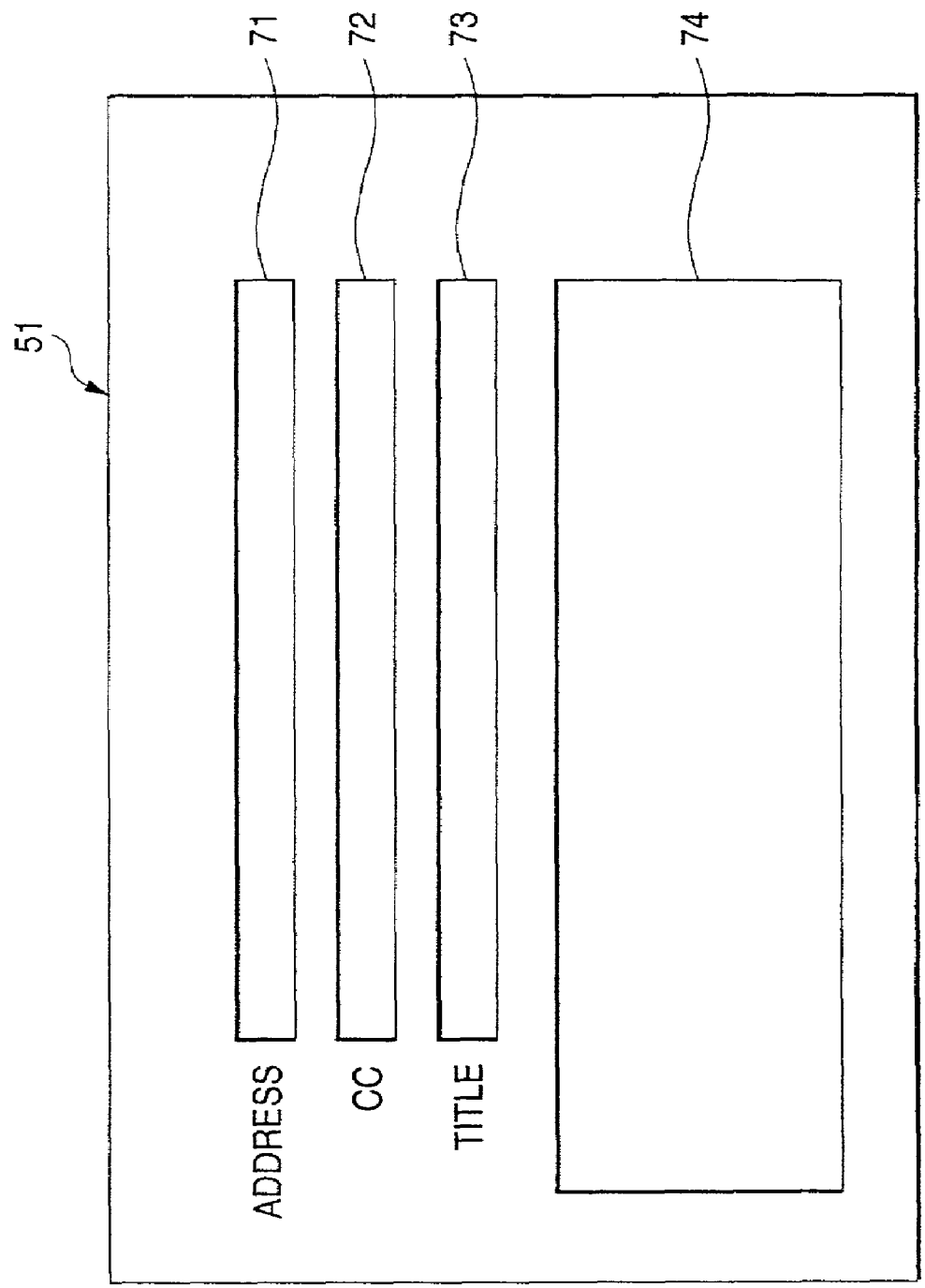
FIG. 16 is an example picture that is displayed on the display device.

A title reflecting the content of the e-mail is input to a title space 73. A message to be sent as the e-mail is input to a message space 74. When the e-mail application corresponding to the picture of FIG. 16 is activated by a member's performing an input manipulation such as clicking on a portion of the bulletin board of FIG. 12 where a name is shown, a mail address of the member corresponding to the name is usually shown in the address space 71. If the mail address thus shown the named person's mail address itself (i.e., the mail address of the user that is stored as the "mail address" (see FIG. 3A) in the user database 4), it might be used for improper purposes by a third person. This leads to a security problem. Therefore, according to this embodiment, a mail address to be shown in the address space 71 is generated by using the community number and the member ID.

For example, the following mail address including a community number XXXXXX and a member ID YYYYY is shown in the address space 71:

XXXXXX-YYYYY@server.ics.co jp

When transmission processing is performed on the e-mail having the above mail address is shown in the address space 71, the e-mail is first received by the server 3. The server 3 analyzes the mail address that is written as the address of the received e-mail. That is, the server 3 reads out data whose community number and member ID coincide with those constituting the mail address by searching the member database 6.

The data that is read from the member database 6 includes a user number. Then, the server 3 reads out data corresponding to the user number by searching the user database 4. The data that is read from the user database 4 includes the user's mail address. The server 3 rewrites the address to which the e-mail is to be delivered to correspond to the mail address read from the user database 4 and sends the e-mail.

When the e-mail whose address has been rewritten is sent, the transmission source mail address of the e-mail is formed by the community number and the member ID of the member who ordered the transmission of the e-mail. When the user who has received the above e-mail sends a reply e-mail, similar processing is performed by the server 3 to relay the reply e-mail.

With the above mechanism, an e-mail can be exchanged between members of a community without opening real mail addresses. With this mechanism for e-mail exchange, mail address conversion cannot be performed by the server 3 for an e-mail that is sent from a user who is not registered as a member of a community. This means that even if a third person obtains a mail address including a community number and a member ID, he cannot send an e-mail to that mail address because he is not a member of the same community. Thus, the problem of members of the community receiving annoying e-mails from undesirable third parties is prevented.

The system may be configured in a manner such that each member can select a setting as to whether e-mail exchanges with other members is to be allowed.

E-mail is used not only for information exchange between members, but also for writing messages to a bulletin board. For example, a service may be provided within a community in which, when a message is written to a bulletin board, the message is sent to prescribed members (i.e., members who have selected the necessary setting) by e-mail.

Where such a setting is made, when a new message is written to a bulletin board, the message is sent to a member (assumed to be member A) by e-mail. When member A reads the e-mail, he finds that the mail address of the transmission source (usually becomes a reply destination) of the e-mail is a mail address in the following form that includes a community number XXXXX and a message number ZZZZZ:

XXXXX-ZZZZZ@server.ics.co.jp

When member A sends a reply e-mail by using the above reply destination mail address, it is received by the server 3. The server 3 analyzes the mail address. A community (bulletin board) can be identified by the community number included in the mail address and a message in the bulletin board to which the reply e-mail is directed can be identified by the message number.

Using such a mail address makes it possible to make an analysis as to which message a reply e-mail (writing) is directed to. Therefore, written messages on a bulletin board can be displayed in layered form.

In addition to the service in which new messages written to a bulletin board may be sent by e-mail, another service may be provided in which a message includes one or more keywords that are selected by respective members. An e-mail is sent to the member who set the keyword included in the message. Keywords are set by respective members and each of the set keywords is stored as a "call keyword" (see FIG. 3C) in the member database 6.

Where such a service is provided, when a new message is written, the server 3 judges whether the written message, including the name (handle name) of a user (or a member) who has written the message, includes any of the keywords that are stored as the "call keywords" in the member database 6. If the judgment result is affirmative, the server 3 sends the message itself by e-mail to the member who set the keyword. The message sent to the member who set the keyword may include the actual message written on the bulletin board or a message indicating that a writing has been made.

Figure 17:
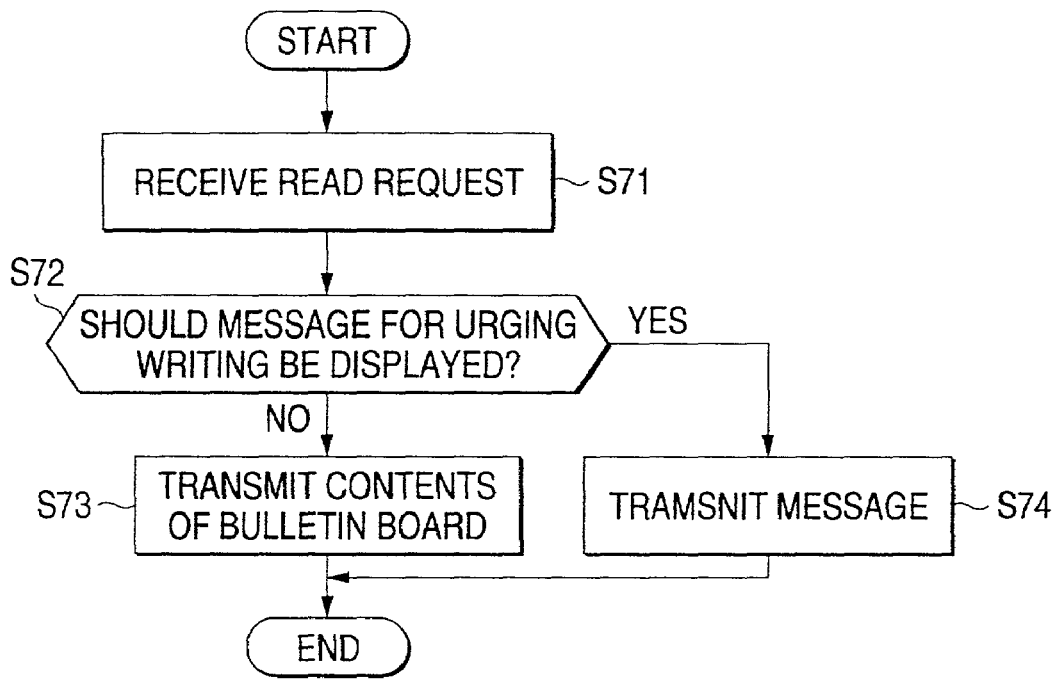
FIG. 17 is a flowchart showing an operation that relates to browsing of a bulletin board.

Messages written on a bulletin board are browsed by members (users). A bulletin board having a small number of written messages is browsed by a small number of users. As a result, the number of users who write messages to the bulletin board decreases. As is understood from the above, the number of written messages is a major factor of determining the quality of a bulletin board. A mechanism for increasing the number of written messages will be described below with reference to the flowchart of FIG. 17.

The server 3 receives a bulletin board browsing (reading) request from a user at step S71. At step S72 the server 3 judges whether to display a message for urging members to write to the bulletin board. This judgment may be made in a probabilistic manner or in accordance with the number of written message on the reading-requested bulletin board.

Figure 18:
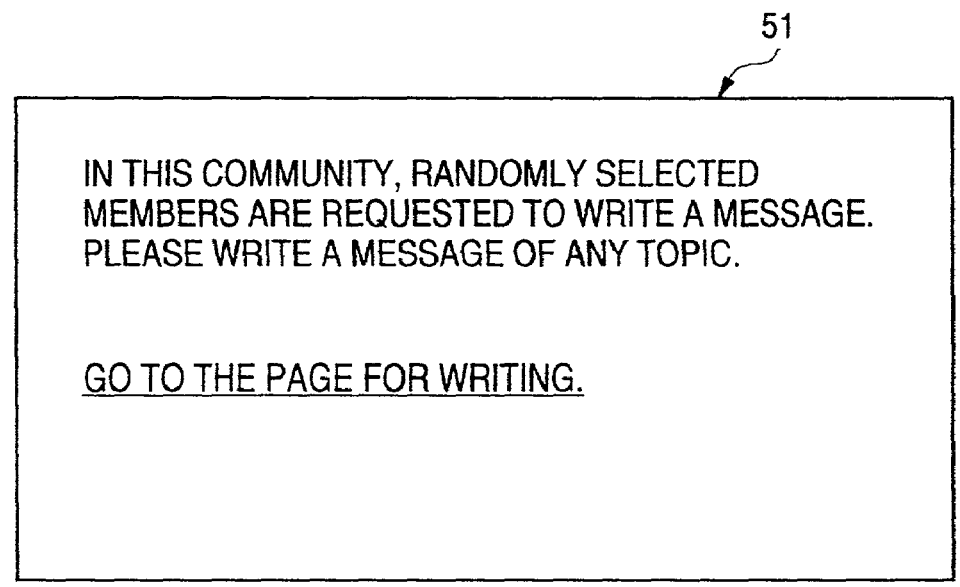
FIG. 18 is an example message for urging writing that is displayed on the display device.

If it is judged at step S72 that the message for urging writing to the bulletin board need not be displayed, the process goes to step S73, where the contents of the reading-requested bulletin board are transmitted to the member (terminal 1) who requested the reading. On the other hand, if it is judged at step S72 that the message for urging members to write to the bulletin board should be displayed, the process goes to step S74, where the message for urging members to write to the bulletin board is transmitted to the terminal 1. A message as shown in FIG. 18 is displayed on the display device 51 of the terminal 1 that has received the transmitted message.

The member who has received such a message is forced to go to a page for writing because he is only allowed to manipulate a single button such as "Go to the page for writing a message" that is linked to the page for writing messages. Activity on the bulletin board can be increased by moving members to the page for writing messages and encouraging them to write a message, although they are not forced to do so.

Figure 19:
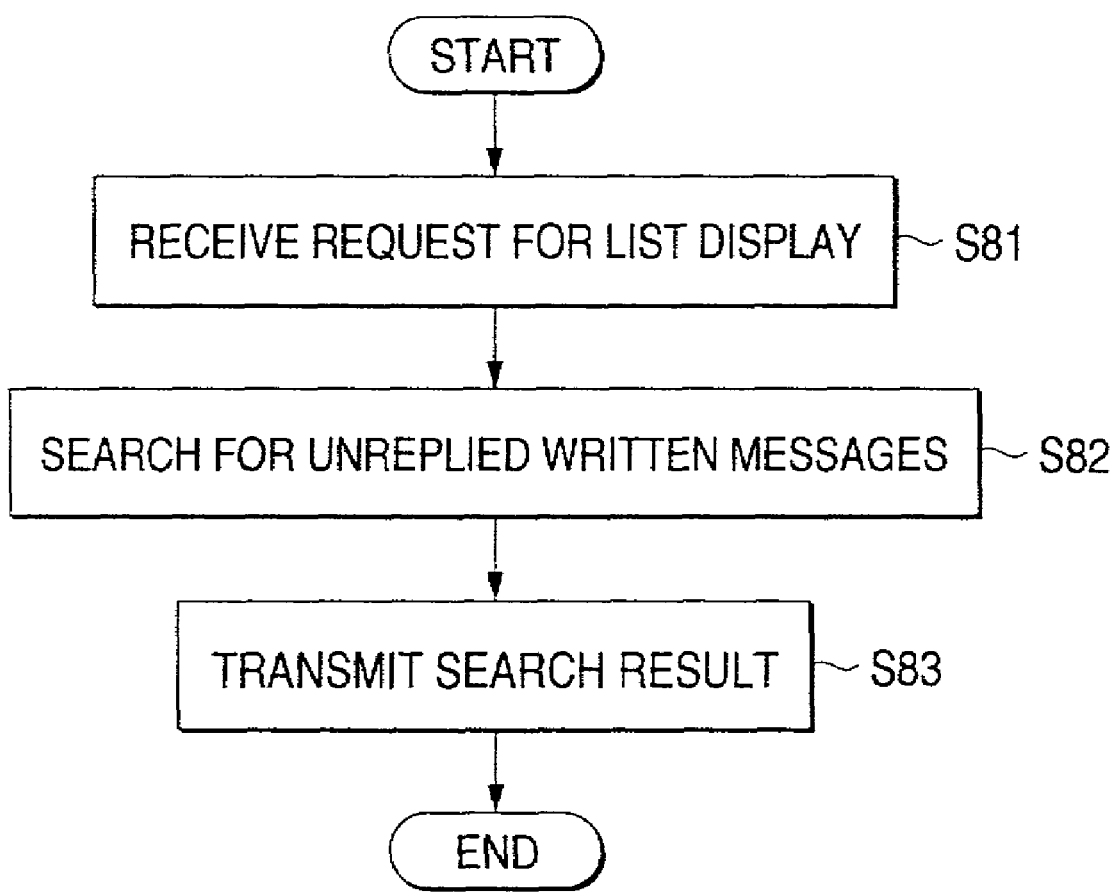
FIG. 19 is a flowchart showing an operation that is performed for unreplied written messages.

Another mechanism for increasing the activity on a bulletin board will be described below with reference to the flowchart of FIG. 19. The owner of a community may issue a request for displaying a list of all of the written messages that have not received a reply. The server 3 receives the request at step S81. At step S82, the server 3 determines which community is the community managed by the owner who sent the request, and extracts all written messages that have not received a reply (i.e., written messages having no child messages) by searching the data of the bulletin board corresponding to the community as determined above (i.e., the data stored in the bulletin board database 7).

At step S83 the results of the extraction step are transmitted to the terminal 1 of the owner. Checking the list of unreplied written messages of the search result, the owner himself may send replies to the written messages that heretofore have not received replies. By providing the above mechanism in which the owner sends replies to unanswered written messages, it is expected that the bulletin board will experience increased activity as long as the owner properly manages the bulletin board in this manner.

Although the above operation is such that the owner himself can check the list of unresponded to written messages and can follow up by writing replies after checking the unanswered written messages, in an alternative embodiment, the system may be configured in a manner such that users (members) can also check the list of written messages that have not received replies. In the latter case, there may exist users who send replies after browsing unreplied written messages. As a result, the bulletin board can be kept active more efficiently.

In addition to the mechanism for minimizing the number of written messages that are not replied to by having the owner and/or users cull the list of unreplied messages voluntarily; another mechanism may be provided in which the server 3 extracts the unanswered written messages and informs the owner of which written messages have not received responses. An operation described below with reference to the flowchart of FIG. 20 is then performed by the server 3.

At step S91 the server 3 searches the bulletin board database 7 and extracts written messages that have not received responses (i.e., written messages having no child message) and for which a prescribed time has elapsed from the time when they were written. If written messages that have not been responded to have been extracted from the bulletin board of a community, the server 3 sends an e-mail to the owner of the community at step S92.

The contents of the e-mail to be transmitted to the owner may be such as to merely inform the owner of the presence of such written messages that have not received replies. Alternatively, the owner may receive the unresponded to written messages themselves. Receiving and checking the e-mail, the owner may perform the act of writing replies to the unreplied to written messages and can thereby activate the bulletin board managed by himself.

Figure 20:
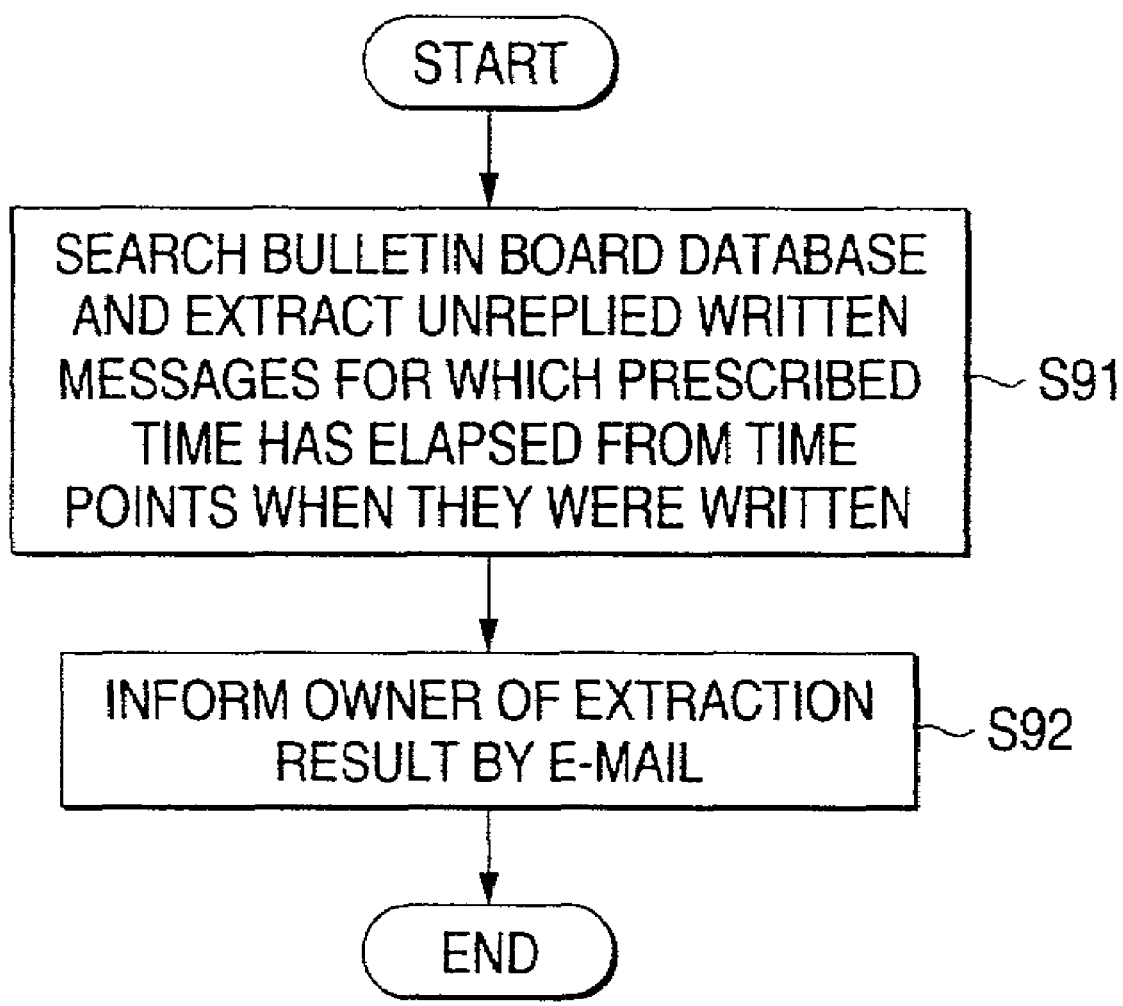
FIG. 20 is a flowchart showing another operation that is performed for unreplied written messages.

Although in the flowchart of FIG. 20 an e-mail is sent to the owner, an e-mail may be alternatively or additionally sent to the members of the community. In the latter case, it is expected that all the members will have a desire jointly to increase activity on the bulletin board and that the sense of unity will thereby develop among the members of the community.

The operation of the flowchart of FIG. 20 is performed regularly, for example, at prescribed times every night.

Figure 21:
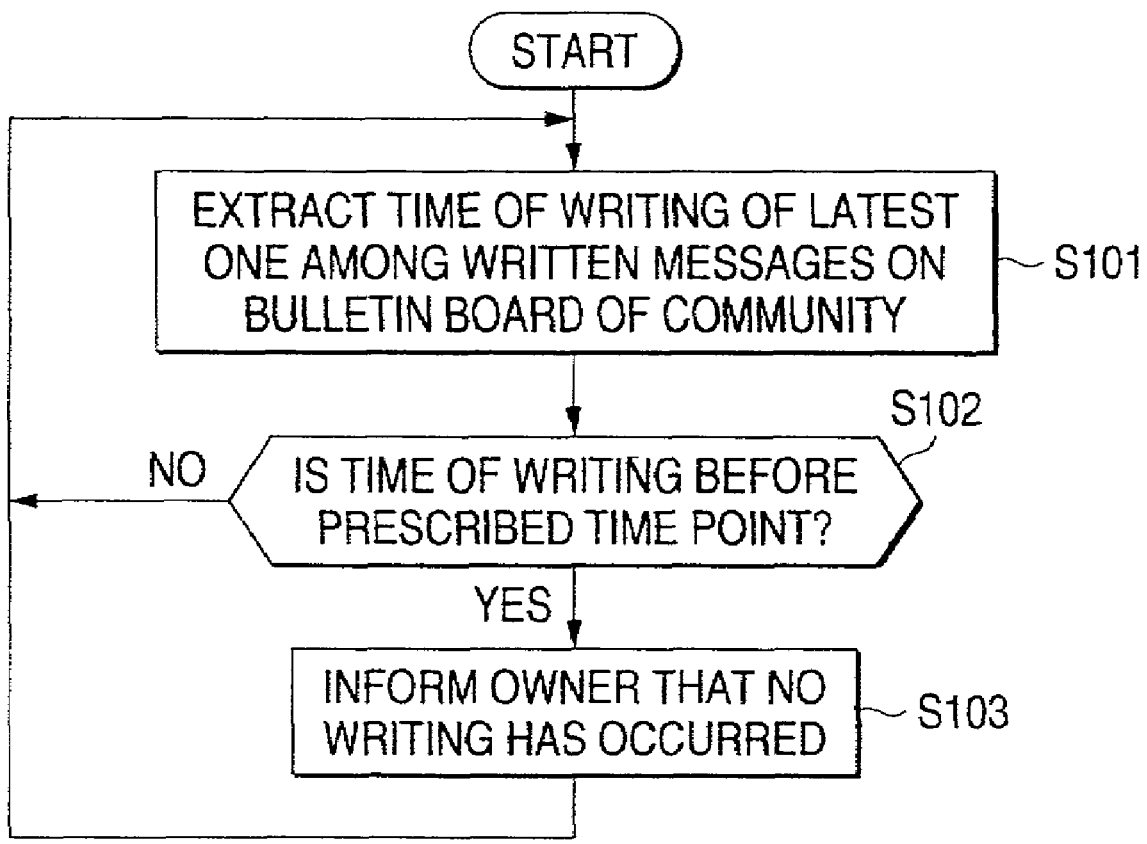
FIG. 21 is a flowchart showing an operation that is performed for a bulletin board to which no message has been written for a prescribed time.

Although the presence of written messages that have not received responses is unfavorable in terms of activation of the bulletin board, the absence of written messages is even more unfavorable. To avoid this latter state, the server 3 regularly performs an operation shown in a flowchart of FIG. 21.

At step S101, the server 3 extracts the time at which the latest of the written messages on the bulletin board of a certain community was written by using the data that are stored as the item "time" in the bulletin board database 7. At step S102, the server 3 judges whether the extracted time at step S101 is prior to a prescribed point in time.

For example, the prescribed point in time may be set to a time one day before the present time. With this setting, if it is determined at step S102 that the extracted time is prior to the prescribed point in time, it means that no message has been written to the bulletin board for one full day (24 hours). In this case, the process goes to step S103, where an e-mail for informing the owner that no message has been written to the bulletin board for the prescribed time is sent to the owner.

Naturally, the e-mail may also be sent to the members as well. Reading such an e-mail, the owner or the members may decide to write a message to the bulletin board and thereby activate the bulletin board.

The owner of each community makes a setting as to whether to open the bulletin board thus being activated to members of the community only or to non-member users as well. The degree of opening the bulletin board is set as the item "degree of read openness" in the community database 5 as described previously with reference to FIG. 3B.

Figure 22:
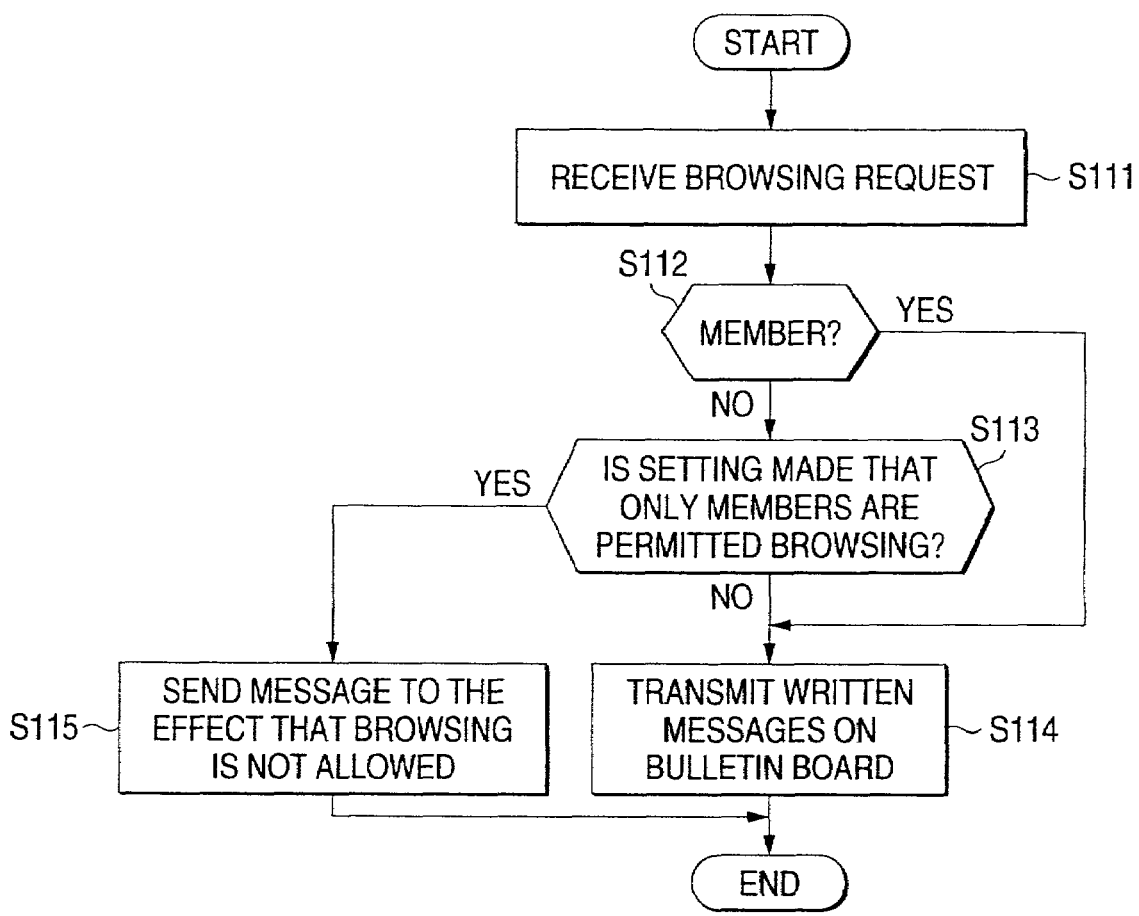
FIG. 22 is a flowchart showing an operation that relates to browsing of a bulletin board.

An operation of the server 3 that is performed when a user requests reading (browsing) of the bulletin board of a certain community will be described below with reference to a flowchart of FIG. 22. At step S111, the server 3 receives a request for browsing the bulletin board of a certain community (assumed to be community A) from a terminal 1. Upon receiving the browsing request at step S112, the server 3 judges whether the user (at the terminal 1) who is requesting to browse the bulletin board is a member of community A by searching the member database 5.

If it is judged at step S112 that the user who is requesting to browse is not a member of community A, the process goes to step S113, where a determination is made whether the bulletin board of community A is set in a manner such that it can be browsed by members only by referring to the "degree of read openness" (see FIG. 3B) corresponding to community A in the community database 5.

If, by referring to the "degree of read openness," it is judged at step S113 that the bulletin board of community A can be browsed by users other than members, in other words, the bulletin board can be browsed by any user who requests browsing, the process goes to step S114, where the written messages on the bulletin board of community A are transmitted to the terminal 1 of the user who is requesting browsing.

The process goes to step S114 also when it is judged at step S112 that the user who is requesting browsing is a member of community A. Since any member of community A can browse the bulletin board, the process goes to step S114 skipping step S113. At step S114, the written messages on the bulletin board of community A are transmitted to the terminal 1 of the member who is requesting browsing.

On the other hand, if it is judged at step S113 that the bulletin board of community A is set in such a manner that it can be browsed only by the members, the process goes to step S115, where a message that refuses browsing such as "Only the members are permitted browsing" is sent to the user who is requesting browsing.

In general, a state that writing to and browsing of a bulletin board are performed frequently is good in terms of activation of the bulletin board. However, there are users whom it is undesirable to have perform writing or browsing activities. There may be provided a mechanism for eliminating such users from the community by registering them.

The owner registers such undesirable users, for example users who were once forced to withdraw from the community, through a picture for performing the work of managing his own community. Once such a user is registered, the "status flag" (see FIG. 3C) in the member database 6 is written to a flag to the effect that the user cannot again join the community.

When a certain user (assumed to be user A) wants to join a community and goes through the prescribed registration procedure, the server 3 searches for data in the member database 6 that corresponds to the community that user A wants to join and judges whether data relating to user A already exists. If it is judged that there exists such data, the server 3 refers to the "status flag" of the data and judges whether a flag to the effect that user A cannot join the community is set.

If it is judged that such a flag is set, the server 3 sends a message to user A such as "Your request for joining the community has been refused." If it is judged that data relating to user A exists in the member database 6 and that its "status flag" indicates that user A is already a member of the community, the server 3 sends a message to user A such as "You have already been registered as a member of the community."

As described above, the owner is given various authorities such as those to delete written messages on the bulletin board, to write replies to unreplied written messages, to force users to withdraw who are not desired to remain in the community, and to make a setting for preventing such users from joining the community again. However, it is very laborious for the owner to exercise those rights relating to the management of the community by himself.

Further, if the owner neglects to do such work, the community could decay into an unfavorable state. Therefore, according to the present invention, the authority to perform such management tasks may be given to various members of the community. The owner can appoint members of the community as staff members and the appointed staff members can exercise all or part of the authorities of the owner.

A flag indicating that the associated member has been appointed as a staff member is set as the "right flag" (see FIG. 3C) in the member database 6 corresponding to the appointed staff member. Appointing staff members as described above can decrease the work load of the owner relating to the management of the community and thereby keep the community in a positive state.

The above series of operations can be performed by either hardware or software. Where the series of operations is performed by software, programs constituting the software are installed from a recording medium to a computer that is incorporated in dedicated hardware or a general-purpose personal computer, for example, that can perform various functions when various programs are installed therein.

As shown in FIG. 2, the above-mentioned recording medium is a package medium such as the magnetic disk 31 (including a floppy disk), the optical disc 32 may include a CD-ROM (compact disc-read only memory) and a DVD (digital versatile disc), the magneto-optical disc 33 may include a MD (mini-disc), or the semiconductor memory 34, each of which is distributed separately from a computer to provide programs to a user and on each of which the programs are recorded. Alternatively, the recording medium may be a ROM 12, wherein the hard disk drive includes the storage section 18, or a like recording medium each of which is provided to a user in a state that it is incorporated in a computer in advance and on each of which programs are stored.

In this specification, steps of a program provided by a medium may be executed in time-series order that is described in the specification or may be executed in parallel or individually rather than in time-series order.

In this specification, the term "system" means the entire apparatus consisting of a plurality of apparatuses.

In the information processing apparatus and the community managing method according to the invention, pieces of positional information of respective communities in a virtual space and information relating to bulletin boards that are provided in the communities are stored. When positional information of a newly generated community is stored, information relating to the newly generated community and to be written to bulletin boards of communities that are near the newly generated community in the virtual space is generated and stored. Therefore, installation of a bulletin board can be advertised easily and efficiently.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

What is claimed is:

1. An information processing apparatus for managing a plurality of communities in a virtual space, comprising:

first storage means for storing pieces of positional information of the respective communities in the virtual space;

second storage means for storing information relating to bulletin boards that are provided in the communities, wherein when positional information of a newly generated community is stored in the first storage means, and wherein information relating to the newly generated community and which is to be written to bulletin boards of communities that are near the newly generated community in the virtual space is generated and stored in the second storage means;

extracting means for searching among the information stored in the second storage means for each of the communities, for time points indicating when messages were written to the bulletin board and extracting a time point corresponding to a time when a latest message was written; and sending means for sending an e-mail to an owner of a bulletin board having the latest message if the time point extracted by the extracting means is before a prescribed time point, wherein the information relating to the bulletin board that is stored in the second storage means includes at least one of a community ID for identification of the community, a message ID for identification of a message on the bulletin board, a time when the message was written, a user ID that is assigned to a user who wrote the message, and a message ID of another message that is included if the message is a reply to said another message.

2. The information processing apparatus according to claim 1, wherein the first storage means further stores, for each of the communities, information indicating whether a setting is made so that only members of the community can perform writing to the bulletin board and information indicating whether a setting is made so that only the members of the community can perform reading from the bulletin board.

3. The information processing apparatus according to claim 1, wherein the first storage means further stores, for each of the communities, information indicating whether a setting is made so that writing to the bulletin board can be performed by e-mail.

4. The information processing apparatus according to claim 1, wherein the first storage means further stores, for each of the communities, information of an image that has been set by an owner of the community and is to be shown on the bulletin board.

5. The information processing apparatus according to claim 1, wherein the first storage means further stores, for each of the communities, information relating to an entrance questionnaire to be presented to a user who wants to join the community and information relating to a withdrawal questionnaire to be presented to a user who wants to withdraw from the community.

6. The information processing apparatus according to claim 1, wherein when a bulletin board message is exchanged with another information processing apparatus by using an e-mail, a mail address of the e-mail includes a community ID and a message ID.

7. The information processing apparatus according to claim 1, further comprising a third storage means for storing at least one of a community ID for identification of a community, a user ID that is assigned to a user who uses the virtual space, a member ID that is assigned to a member of the community for his identification, information indicating whether the member is allowed to exercise all or part of the authorities of an owner of the community, and information indicating one of a state that the user is currently a member of the community, a state that the user has withdrawn from the community, and a state that the user is not allowed to join the community again.

8. The information processing apparatus according to claim 7, wherein when information is exchanged between members by using an e-mail, a mail address of the e-mail includes a community ID and a member ID.

9. The information processing apparatus according to claim 7, wherein the third storage means further stores information relating to a keyword that was set by a member, the information processing apparatus further comprising:
   judging means for judging, when a new message is written to a bulletin board, whether the new message includes the keyword; and
   sending means for sending an e-mail to the member who set the keyword if the judging means judges that the new message includes the keyword.

10. The information processing apparatus according to claim 1, further comprising sending means for sending a message that requests writing to the bulletin board to a user when the user requests reading of a bulletin board, the message request being sent to users randomly at a prescribed probability rate.

11. The information processing apparatus according to claim 1, further comprising:
   a fourth storage means for storing points that reflect evaluations of each message on the bulletin boards by users of the virtual space; and
   display control means for controlling display of each message in accordance with the number of points corresponding to the message that is stored in the fourth storage means.

12. The information processing apparatus according to claim 1, further comprising:
   a fifth storage means for additively storing, for each user, points of evaluation by an owner of a related one of the bulletin boards on messages written by the user; and
   display control means for controlling display of a message written by the user in accordance with the number of points of the user that is stored in the fifth storage means.

13. An information processing apparatus for managing a plurality of communities in a virtual space, comprising:
   first storage means for storing pieces of positional information of the respective communities in the virtual space;
   second storage means for storing information relating to bulletin boards that are provided in communities, wherein when positional information of a newly generated community is stored in the first storage means, and wherein information relating to the newly generated community and which is to be written to bulletin boards of communities that are near the newly generated community in the virtual space is generated and stored in the second storage means;
   extracting means for extracting, for each of the communities, an unreplied to message having no message ID of another message among the information stored in the second storing means; and
   communicating means for communicating, to an owner of a bulletin board having the unreplied message, the unreplied to message itself extracted by the extracting means, wherein the information relating to the bulletin board that is stored in the second storage means includes at least one of a community ID for identification of the community, a message ID for identification of a message on the bulletin board, a time when the message was written, a user ID that is assigned to a user who wrote the message, and a message ID of another message that is included if the message is a reply to said another message.

14. The information processing apparatus according to claim 13, wherein the communicating means performs communication when instructed by the owner of the bulletin board.

15. The information processing apparatus according to claim 13, wherein the communicating means performs communication on a regular basis by e-mail.

16. An information processing apparatus for managing a plurality of communities in a virtual space, comprising:
   first storage means for storing pieces of positional information of the respective communities in the virtual space;
   second storage means for storing information relating to bulletin boards that are provided in communities, wherein when positional information of a newly generated community is stored in the first storage means, and wherein information relating to the newly generated community and which is to be written to bulletin boards of communities that are near the newly generated community in the virtual space is generated and stored in the second storage means;
   extracting means for extracting, for each of the communities, an unreplied message having no message ID of another message among the information stored in the second storing storage means; and
   communicating means for communicating, to an owner of a bulletin board having the unreplied to message, a message to the effect that the unreplied to message exists on the bulletin board, wherein the information relating to the bulletin board that is stored in the second storage means includes at least one of a community ID for identification of the community, a message ID for identification of a message on the bulletin board, a time when the message was written, a user ID that is assigned to a user who wrote the message, and a message ID of another message that is included if the message is a reply to said another message.

* * * * *